US006520694B1

(12) United States Patent
Hall et al.

(10) Patent No.: US 6,520,694 B1
(45) Date of Patent: Feb. 18, 2003

(54) SYSTEM AND METHOD FOR PROCESSING PHOTOGRAPHIC FILM IMAGES

(75) Inventors: Jeffrey L. Hall, Rochester, NY (US); John T. Keech, Penfield, NY (US); Robert A. Arcus, Penfield, NY (US); Eric R. Schmittou, Rochester, NY (US); John P. Spence, Webster, NY (US); Ronald M. Wexler, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/051,074

(22) Filed: Jan. 18, 2002

(51) Int. Cl.[7] .................................... G03B 13/00

(52) U.S. Cl. ....................... 396/567; 396/570; 396/626

(58) Field of Search ............................ 396/567–570, 396/578, 626, 639, 571, 612; 355/27–29

(56) References Cited

U.S. PATENT DOCUMENTS

| | | | |
|---|---|---|---|
| 4,170,478 | A | 10/1979 | Case et al. |
| 4,264,716 | A | 4/1981 | Vincent et al. |
| 4,482,626 | A | 11/1984 | Twist et al. |
| 4,839,262 | A | 6/1989 | Schwartz |
| 4,859,574 | A | 8/1989 | Gormel |
| 4,876,174 | A | 10/1989 | Ishikawa et al. |
| 4,892,804 | A | 1/1990 | Vincent et al. |
| 4,921,779 | A | 5/1990 | Cullinan et al. |
| 4,923,782 | A | 5/1990 | Schwartz |

(List continued on next page.)

FOREIGN PATENT DOCUMENTS

| | | |
|---|---|---|
| DE | 0122457.5 | 9/2001 |
| EP | 0 434 097 A1 | 6/1991 |
| EP | 0 530 921 A1 | 3/1993 |
| EP | 0 611 986 A1 | 8/1994 |
| EP | 0 193 389 B2 | 3/1995 |
| EP | 0 534 086 B1 | 3/1998 |
| EP | 0 532 003 B1 | 6/1998 |
| EP | 1 107 058 A2 | 6/2001 |
| JP | 11-109583 | 4/1999 |
| JP | 11-184053 | 7/1999 |

OTHER PUBLICATIONS

Photographic Silver Halide Emulsions, Preparations, Addenda, Systems and Processing, Sep. 1996, *Research Disclosure*, No. 389, pp. 591–639.

Color Negative Processing, *British Journal of Photography Annual*, 1988, pp. 196–198.

Textbook: J.R. Milch, *Image Processes and Materials*, 1989, Chapter 10.

U.S. patent application Ser. No. 10/027,382, filed Dec. 21, 2001 by Piccinino, Jr. et al.

U.S. patent application Ser. No. 10/012,673, filed Oct. 30, 2001 by Twist.

U.S. patent application Ser. No. 09/920,495, filed Aug. 1, 2001 by Twist et al.

U.S. patent application Ser. No. 09/705,404 filed Nov. 3, 2000 by Brown et al.

U.S. patent application Ser. No. 09/706,474, filed Nov. 3, 2000 by Arcus et al.

U.S. patent application Ser. No. 09/706,463, filed Nov. 3, 2000 by Haye et al.

*Primary Examiner*—D. Rutledge
(74) *Attorney, Agent, or Firm*—Thomas H. Close

(57) ABSTRACT

A method and system for processing photographic film images, includes the steps of: providing a film processor having a plurality of adjustable parameters for a given process for processing a family of photographic films; defining a plurality of processing profiles having different values of the adjustable parameters for different members of the film family; and chemically processing a photographic film that is a member of the film family using the processing profile for that family member.

96 Claims, 3 Drawing Sheets

U.S. PATENT DOCUMENTS 4,927,746 A 5/1990 Schwartz
5,037,725 A 8/1991 Cullinan et al.
5,267,030 A 11/1993 Giorgianni et al.
5,278,033 A 1/1994 Hagiwara et al.
5,334,491 A 8/1994 Foster et al.
5,354,646 A 10/1994 Kobayashi et al.
5,362,610 A 11/1994 Yoshimoto
5,376,509 A 12/1994 Yoshimoto et al.
5,424,176 A 6/1995 Schmittou et al.
5,441,852 A 8/1995 Hagiwara et al.
5,491,050 A 2/1996 Brust et al.
5,523,195 A 6/1996 Darmon et al.
5,529,890 A 6/1996 McGuckin et al.
5,534,396 A 7/1996 McGuckin et al.
5,552,264 A 9/1996 Cullinan et al.
5,578,432 A 11/1996 McGuckin et al.
5,582,958 A 12/1996 Buchanan et al.
5,585,226 A 12/1996 Strickland et al.
5,633,124 A 5/1997 Schmittou et al.
5,645,980 A 7/1997 McGuckin et al.
5,646,327 A 7/1997 Burns et al.
5,652,085 A 7/1997 Wilson et al.
5,660,974 A 8/1997 Marrese et al.
5,667,944 A 9/1997 Reem et al.
5,670,305 A 9/1997 Gordon et al.
5,679,501 A 10/1997 Seki et al.
5,691,120 A 11/1997 Wilson et al.
5,693,456 A 12/1997 Foster et al.
5,709,982 A 1/1998 Marrese et al.
5,716,765 A 2/1998 McGuckin et al.
5,753,423 A 5/1998 Buongiorne et al.
5,804,356 A 9/1998 Cole et al.
5,827,635 A 10/1998 Cole
5,864,729 A 1/1999 Piccinino, Jr. et al.
5,890,028 A 3/1999 Nomura et al.
5,960,227 A 9/1999 Kurokawa et al.
5,988,896 A 11/1999 Edgar
6,017,687 A 1/2000 Darmon et al.
6,037,111 A 3/2000 Haye et al.
6,077,651 A 6/2000 Darmon et al.
6,077,653 A 6/2000 McGarry et al.
6,207,360 B1 3/2001 Ishikawa et al.
6,221,569 B1 4/2001 Ishikawa
6,319,660 B1 10/2001 Allway et al.
6,412,990 B1 * 7/2002 Stoffel et al. ............... 396/604

* cited by examiner

SYSTEM AND METHOD FOR PROCESSING PHOTOGRAPHIC FILM IMAGES

FIELD OF THE INVENTION

The present invention relates to a method and system for providing photofinishing services for consumer imaging, including the processing of silver-halide based color photographic films.

BACKGROUND OF THE INVENTION

Two types of light-recording materials are used to record photographic images. One type of material is silver halide used in conventional imaging systems, the other type is silicon-based used in the newer electronic imaging systems. Within the silver halide-based imaging system there are two general use categories. One of these use categories is the film-based systems for camera use and the other is the paper-based systems used in printers. Within these use-categories are standardized processing cycles and associated processing hardware that convert the recorded silver-halide image into a useable image. For color negative still photography such a standardized processing cycle is Process C-41. For reversal still photography such a standardized processing cycle is Process E-6. For color negative motion imaging photography, such a process is Process ECN-2. In the context of this historical hierarchy and standardization, a family of films would be all films that are intended to be processed using a specific, standard processing cycle. For example, all color negative films for still photography represent a family of films that are to be processed within the trade reference Process C-41.

Film manufacturers formulate their products to provide satisfactory results using such standardized process cycles even though optimum performance for a particular film formulation may be achieved under different conditions than obtained in a standardized process cycle. Addition of accelerators for development (U.S. Pat. No. 6,319,660 issued Nov. 20, 2001 to Allway et al.); accelerators for bleaching (EP 0 193 389 B2, published Mar. 15, 1995); and accelerators for fixing (U.S. Pat. No. 5,633,124 issued May 27, 1997 to Schmittou et al.), witness the problems that film manufacturers have faced in order to get a given film formulation to conform to the standardized process. Clearly, film manufacturers would welcome a processing cycle wherein the process cycle and perhaps even the processing solution compositions are defined by them in order to optimize the performance of a given film formulation.

However, these processing cycles and associated hardware are slow to change at a time when more rapid response to marketplace changes is important to remain competitive. For example, over the years, the turnaround time for a customer using color negative film to receive their photographic prints from a photofinisher has undergone a steady improvement from several days to overnight service and presently to 1 hour service. The advent of digital photography has reduced the time from image capture to viewing to a matter of seconds. To remain competitive with digital photography, it would be desirable to further reduce the processing turnaround time for consumer photographic color negative film systems to provide an essentially real time photofinishing order fulfillment system.

The KODAK C-41 Process is described in British Journal of Photography Annual 1988, pages 196–198. This trade standard chemical process uses a development time of 195 seconds at a temperature of 100° F. and produces an archival negative that is optically printable. Over the years, the time in the post-development solutions has been shortened such that the current minilab process (Process C-41 SM) requires 7 minutes; 15 seconds to process film with an additional 1 to 2 minutes to dry the film. Clearly, near real time order fulfillment processing must process film more rapidly than this trade reference process.

U.S. Pat. No. 5,988,896 issued Nov. 23, 1999 to Edgar, proposes a photographic negative film processing system and method that is capable of operating near real time by using a non-conventional chemical development process and scanning of the non-conventionally developed silver in the film. Some problems with this approach are that the processing method is not generally useful for all types of color negative film structures that are currently in use and that useful photographic negatives are not produced in the process.

It would be desirable to provide a method that can accommodate standard film processes and that also returns conventional film negatives in near real time. Conventional color negative film development processes include the C-41 process useable with Kodak, Fuji, Konica, Lucky and Ferrania films, the AP 70 process useable with Agfa films, the CN-16 process useable with Fuji films; and the CNK-4 process useable with Konica films. All of these processes are variations of the C-41 process.

The basic image-forming process of color silver halide photography comprises the exposure of a silver halide color photographic recording material to actinic radiation (such as light) and the manifestation of a useful image by wet chemical processing of the material. The fundamental steps of this wet processing include color development to reduce silver halide to silver and to produce dye images in the color-developed areas of the material. After color development, the silver is removed by a combination of one or more processing steps in which the metallic silver is oxidized by a bleaching agent to silver(I) (referred to as "bleaching"), and silver(I) and any undeveloped silver halide is removed by dissolving it in a silver solvent, commonly known as a fixing agent (referred to as "fixing"). In some photographic processes, bleaching and fixing are combined in a bleach-fixing step using a composition that includes both a bleaching agent to oxidize metallic silver and a fixing agent to dissolve the remaining silver ion. In some process sequences, a treatment with an acidic stop solution or a stop-fixer solution follows development to stop the action of the developing agent. Subsequent to this treatment, the desilvering steps of fixing, bleaching, and/or bleach-fixing are carried out. In other process sequences, the bleach or bleach-fixing treatment immediately follows development. Following these post development steps is a washing step to remove water soluble materials from the film.

Several general approaches have been followed to shorten the process cycle. One approach is to use rapid processing of a photographic film such that the negative produced is not useful in an optical photographic printer, but can be scanned to produce a useful digital image and the digital image processed to produce an acceptable print using a digital printer. See for example U.S. Pat. No. 5,804,356, issued Sep. 8, 1998 to Cole et al. A problem with the rapid processing approach as described is that a fixed process cycle is used for all members of the film family. The total processing time for each film is thereby limited to the member of the film family requiring the longest film processing time to produce stable film densities that can be mapped by subsequent digital processing to the densities produced by the conventional film process. If the process times were to be set to run faster than that required for the member of the film family requiring the longest processing times, the densities produced by that member of the film family would not be stable, thereby resulting in incorrect mapping of densities to the conventional process. An incorrect mapping of densities will result in color errors in a color photographic print. As used herein, a stable density is one obtained from repeatable development conditions that are substantially free of density changes that might occur if the post development steps associated with the processing profile are extended in time.

Another approach is to shorten the process times by increasing the temperature of the solutions. Process QD-21 from Konica is an example of this approach. The development time is reduced to 100 seconds and the total wet time is 3 minutes, 38 seconds by running the process at 106.3° F., with an additional drying time of about 45 seconds for a total dry-to-dry time of about 4 ½ minutes. However, this approach although yielding an archival negative, is a fixed cycle that uses high solution volumes that must be heated, thereby incurring increased power usage. Additionally, it is desirable to further reduce the dry-to-dry time for near real time processing.

Yet another approach is to reduce the number of processing steps in the process cycle. In these cases one or more of the processing steps are eliminated from the process cycle. Such rapid process cycles are described in U.S. Pat. No. 6,221,569 issued Apr. 24, 2001 to Ishikawa, U.S. Pat. No. 6,207,360 issued Mar. 27, 2001 to Ishikawa et al.; EP 1 107 058 A2, Ishikawa et al., published Jun. 13, 2001; U.S. Pat. No. 5,804,356, referenced above, JP11-184053, JP11-109583 and references cited therein. All of these process cycles can be characterized as providing alternative processing of films. The processes are described as new approaches using single time and temperature conditions to effect film development. However, these alternative process cycles do not return an archival film negative to the consumer.

Using conventional continuous photographic film processing machines and employing conventional processing chemistry the turnaround time can be reduced by changing transport speed of the film through the processing solutions. However, this approach does not allow each processing bath to operate independently of the other processing baths, thereby reducing the ability to optimize the overall processing time for different members of the film family, since some members of the film family require more time in one or more of the processing baths than other members of that film family.

Batch film processors wherein each processing step may be adjusted independently have been described. See for example U.S. Ser. No. 09/920,495, filed Aug. 1, 2001 by Twist et al.; U.S. Pat. No. 5,890,028 issued Mar. 30, 1999 to Nomura et al., and U.S. Pat. No. 5,960,227, issued Sep. 28, 1999 to Kurokawa et al. In addition, a continuous processor such as that described in U.S. Pat. No. 5,864,729 issued Jan. 26, 1999 to Piccinino, Jr. et al. allows the time that each bath contacts the media to be adjusted independently of the other baths. The use of these processors has been taught in the context of a common film process for a given film family. For the color negative film family, a problem with this approach is that some members of the color negative film family can be processed faster than other members of this same family. Alternatively, some members of this color negative film family can be processed with less processing chemistry or at lower temperature than other members. If the single process is designed such that all members of the film family are acceptably processed, the total time for processing, or the amount of processing chemistry, or the necessary processing temperature will be determined by the member that requires the longest time, the most chemistry, or the highest temperature, thereby limiting the ability to achieve near real time, chemistry conserving, or energy efficient processing.

There is a need therefore for an improved negative photographic film processing system and method that avoids the problems noted above.

SUMMARY OF THE INVENTION

The need is met according to the present invention by providing a system and method of processing photographic film images, that includes providing a film processor having a plurality of adjustable parameters for a given process for processing a family of photographic films, defining a plurality of processing profiles having different values of the adjustable parameters for different members of the film family, and chemically processing a photographic film that is a member of the film family using the processing profile for that family member.

ADVANTAGES

The system and method of the present invention have the advantages of reducing the time required to process photographic films, in particular color negative photographic films. In a preferred embodiment the process provides a stable film image that can be reused. Alternatively to reducing processing time, processing speed advantages of certain films can be traded for reductions in chemical usage, or energy usage in the process by processing such certain films with less chemistry or at lower temperature.

DETAILED DESCRIPTION OF THE INVENTION

In one embodiment of the present invention a photographic process is adjusted for members of a family of photographic films to process each member of the film family in as short a time as possible while still producing an archival negative image that can be recovered to produce an acceptable print. The resulting archival negative might not be useable for producing an optical print in a conventional photographic printer An acceptable print however can be made according to the present invention by scanning the processed films to produce a digital image and processing the digital image to correct for differences between the system and standard contrast and film speed. The resulting processed digital image can then be printed using a digital printer to produce an acceptable photographic print.

Figure 1:
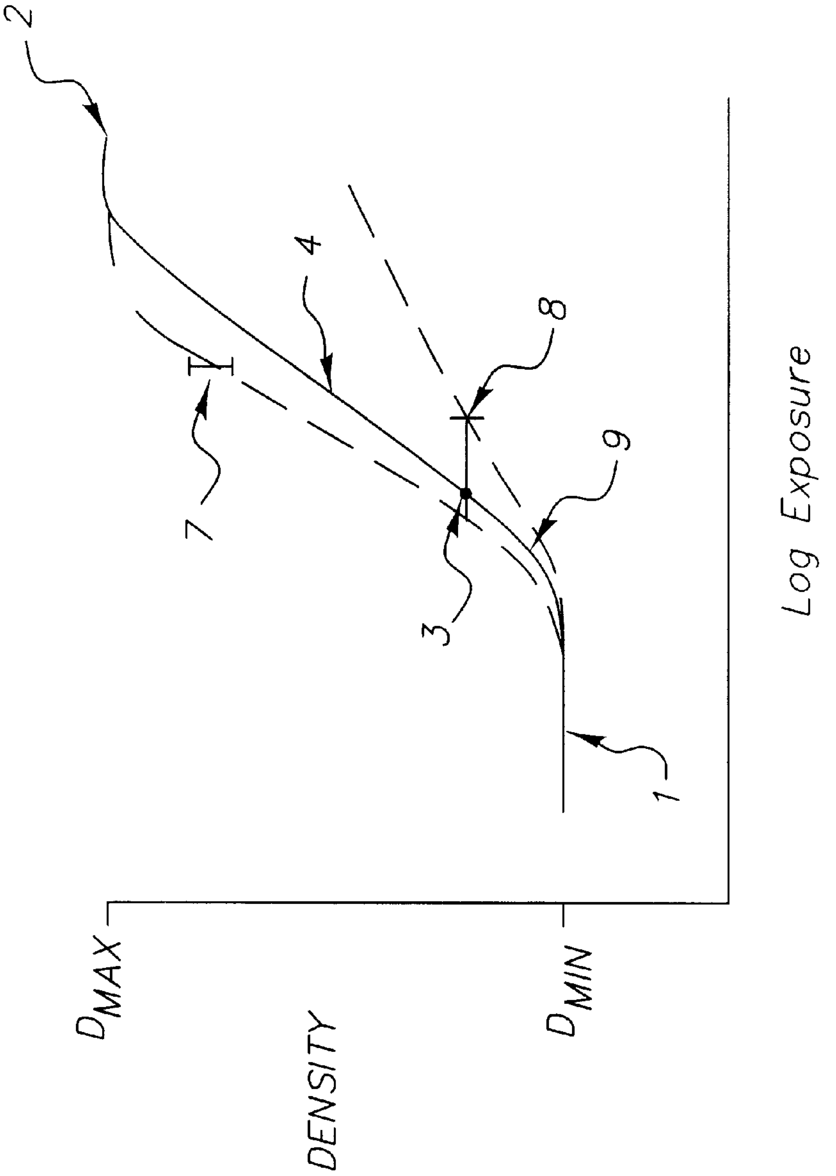
FIG. 1 is a plot of a characteristic curve for a single color record useful in explaining the present invention.

Referring to FIG. 1, common practice refers to a plot of density versus log exposure as the film's characteristic curve 4, shown here for a color negative film. Such a curve is obtained for each color record of a color negative film. These curves typically have a straight-line portion between the toe 9 (where the speed is determined) and the maximum density (D-max) 2. ISO 5800–1979 (E) defines the methodology used to specify the ISO speed of a film. The red, green and blue individual speed points used to calculate the ISO speed are determined at a fixed density called a speed point 3 above the minimum density 1 for each color record (fixed density above D-min) using the standard chemical process recommended by the manufacturer. These red, green, and blue speeds (represented by speed point 3) are then arithmetically combined and used to calculate the film's ISO speed. The manufacturer's film formulation, when tested according to this standard, defines the ISO speed of that film in the standard chemical process. Higher ISO speeds imply a film that can be used under lower light conditions than a similar film with a lower rated ISO speed. Consumers purchase film based on their picture-taking needs and expected lighting conditions and expect the film to perform to the manufacturer's advertised ISO speed, that is, pictorial information in the low light conditions which correspond to the area of the color records used to determine ISO speed is important to the consumer. The near real time processing profiles according to the present invention are by definition, non-standard. These processing profiles need not generate the same ISO speed as defined in the standard when the speed is measured at a fixed density above D-min. However, we have learned that the failure to match this speed metric is not equivalent to a failure of the near real time processing profile to deliver equivalent under-exposure information as would be obtained through the standard chemical processing cycle recommended by the film manufacturer. We have learned that the effective ISO speed of a film processed using the near real time processing profile is more accurately indicated by first determining the individual speed points of the color records as the lowest exposure which gives equivalent granularity to the granularity of the standard process determined at the ISO speed point defined as a fixed density above Dmin when the granularity of the near real time processing response is scaled by the differences between the gamma responses produced by the two processing conditions. Scaling is done by multiplying the granularity of the near real time processing film response by the ratio of the gamma of the standard process to the gamma of the near real time processing response at each exposure point. Gamma is defined as the first derivative of the photographic response described in FIG. 1 determined at each exposure level. The effective ISO of the film processed in the near real time processing condition is determined by substituting the scaled speeds of the individual color records for the speeds determined in the standard process at a fixed density above Dmin in the ISO equation. If the speed determined for the film processed through the alternate process in this manner is lower than the conventional ISO determined when that film is processed through the standard chemical process, then the near real time processing profile is considered slow of the reference process. A near real time processing profile that delivers system speed that is slower by more than 0.15 logE compared to the standard system ISO speed fails to deliver the ISO speed expected by the consumer and is therefore unacceptable. If the near real time processing profile delivers a system speed loss that is 0.15 logE or less (see point on curve labeled 8), then we consider the processing profile to have delivered acceptable signal-to-noise ratio. Preferably, the near real time processing profile would deliver a speed loss that is less than 0.10 logE of the standard chemical process. Most preferably the near real time processing profile delivers a speed loss that is less than 0.05 logE.

When a film is processed using a processing profile according to the present invention, it is important that there be no ambiguities in assigning the color value for each exposure. Therefore it is important that the processing profile reproducibly generate the same densities for equivalent exposures on the same film. Likewise, it is important that any post-development treatment (e.g. bleach and fixing steps) yield stable densities 7. For example, under-bleaching (bleachconcentration too low, too little bleach time, difficult to bleach silver) can lead to retained silver. The color density of the retained silver is added to the color density of the image resulting in an increase in density for that color record. This summed density would not map correctly to the standard chemical process if the mapping function was determined using a processing profile in which retained silver was not present. We refer to such a change as an unstable density. If the processing profile used a bleaching step and this step were extended in time, for instance, then this retained silver could be removed and its color contribution eliminated. Alternatively, one can use a more concentrated bleaching agent or a higher volume of a given solution, or a higher temperature. Any one of these adjustable parameters can be varied to produce a processing profile that is customized for a particular member of a film family. According to the present invention, stable densities are important for color mapping to yield preferred results. We define a stable density as that obtained from repeatable development conditions that are substantially free of density changes that might occur if the post development steps associated with the processing profile are extended in time.

Using the criteria of stable densities, a processing profile for a given member of a film family may be optimized for minimum processing time, minimum chemistry usage, or energy efficiency. A processing profile that is optimized for one member of a film family may not produce stable densities for another member. Thus according to the present invention, a plurality of processing profiles are provided having different value of the adjustable parameters for different members of the film family. According to one aspect of the invention, at least one of the processing profiles will not produce stable densities, system contrast or speed within the range noted above with at least one member of the film family The processing method of the present invention is useful in any processor that allows the processing steps to be independently controlled or modified. Such processors can be batch processors that process a single roll or piece of film at a time within a processing chamber, or continuous processors that process films by conveying them through a series of processing chambers. Such processors can use processing chemistry in a replenished mode, in an unreplenished batch mode, or in a single-use mode. Examples of such processors include less conventional processors such as those described in U.S. Pat. Nos. 5,864,729, 5,890,028, and 5,960,227, all previously referenced; a drum processor such as the Kodak RS-11 Drum Processor; a drum processor as described in GB 0122457.5; or the wave processor described in U.S. Ser. No. 09/920,495, referenced above, the disclosure of which is incorporated herein by reference. One characteristic of these processors is that each processing tank uses a small volume of processing solution in order to effect the desired reactions. For a continuous processor each processing tank may use 1000 cc or less, preferably 500 cc or less, and most preferably 300 cc or less. For the single tank batch processor this volume for each processing solution is 500 cc or less, preferably 250 cc or less, and most preferably 100 cc or less. The rotating processor described in GB 0122457.5 is a batch processor that uses small solution volumes for each processing solution (between 0.1 ml/linear foot to 20 ml/linear foot of 35 mm film) and uses each processing solution volume once (i.e. the processing solutions are not replenished) to process photographic material. This processor processes a photographic material by loading the material into a chamber, introducing a metered amount of processing solution into the chamber, and rotating the chamber in a fashion which forms a wave in the solution through which the material passes. The appropriate solution for each processing stage is added and removed sequentially from the processing space.

A photographic processing method useful with the present invention is a rapid processing protocol that is identified herein as a "merged solution" processing method as described in U.S. Ser. No. 10/012,673, filed Oct. 30, 2001 by Twist. This method generally includes, in order, color development and fixing, and optionally bleaching. For example, a color photographic image can be provided (especially in color negative films) by the following steps:

a) color developing an imagewise exposed color photographic silver halide material in a predetermined volume of an aqueous color developing composition in a processing chamber, and b) without removing the predetermined volume of the aqueous color developing composition or the color photographic silver halide material from the processing chamber, adding a predetermined volume of a photographic fixing composition to the processing chamber to provide a combined aqueous color development/fixing composition, and fixing the color photographic silver halide material. The fixing composition in step B can be a bleach-fixing composition to provide a combined aqueous color development/bleach-fixing composition that bleach-fixes the material.

In one embodiment, the "merged solution" processing method further includes the step of c) without removing the combined aqueous color development/fixing composition or the color photographic silver halide material from the processing chamber, adding a predetermined volume of a photographic bleaching composition to the processing chamber to provide a combined aqueous color development/fixing/bleaching composition, and bleaching the color photographic silver halide material.

The chemical compositions of the solutions used in processors that allow the processing steps to be independently controlled or modified include variations of solution compositions that are known to the trade and are dependent on the operational constraints associated with each processor type or processor design. The color developers can include one or more buffers, antioxidants (or preservatives, such as sulfo-, carboxy, and hydroxy-substituted mono- and dialkylhydroxylamines), antifoggants, fragrances, solubilizing agents, brighteners, halides, sequestering agents, and other conventional addenda. Representative teaching about color developing compositions can be found in U.S. Pat. No. 4,170,478 issued Oct. 9, 1979 to Case et al.; U.S. Pat. No. 4,264,716 issued Apr. 28, 1981 to Vincent et al.; U.S. Pat. No. 4,482,626 issued Nov. 13, 1984 to Twist et al.; U.S. Pat. No. 5,491,050, issued Feb. 13, 1996 to Brust et al.; U.S. Pat. No. 5,709,982 issued Jan. 20, 1998 to Marrese et al.; U.S. Pat. No. 6,037,111 issued Mar. 14, 2000 to Haye et al.; U.S. Pat. No. 6,017,687 issued Jan. 25, 2000 to Darmon et al.; U.S. Pat. No. 6,077,651 issued Jun. 20, 2000 to Darmon et al.; U.S. Ser. No. 09/706,463, filed Nov. 3, 2000 by Haye et al., and U.S. Ser. No. 09/706,474, filed Nov. 3, 2000 by Arcus et al., all incorporated herein by reference.

Typical color developing agents include but are not limited to those disclosed in EP 0 434 097A1, published Jun. 26, 1991; EP 0 530 921A1, published Mar. 10, 1993; and are provided in *Research Disclosure* Publication No. 389, Kenneth Mason Publications Ltd., September 1996, pages 592–639. This reference will be referred to hereinafter as "*Research Disclosure*." In order to protect the color developing agents from oxidation, one or more antioxidants are generally included in the color developing compositions.

In the developer compositions used in the invention both a sulfite compound (such as sodium sulfite, potassium sulfite, sodium bisulfite and potassium metabisulfite) and an additional antioxidant may be utilized. Either inorganic or organic antioxidants can be used as the additional antioxidant. Many classes of useful antioxidants are known, including but not limited to, hydroxylamine (and derivatives thereof), hydrazines, hydrazides, amino acids, ascorbic acid (and derivatives thereof), hydroxamic acids, aminoketones, mono-and polysaccharides, mono- and polyamines, quaternary ammonium salts, nitroxy radicals, alcohols, and oximes. The most preferred antioxidant for use in this invention is hydroxylamine sulfate. Other useful antioxidants are hydroxylamine derivatives as described, for example, in these patents: U.S. Pat. No. 4,892,804 issued Jan. 9, 1990 to Vincent et al.; U.S. Pat. No. 4,876,174 issued Oct. 24, 1989 to Ishikawa et al.; U.S. Pat. No. 5,354,646 issued Oct. 11, 1994 to Kobayashi et al.; U.S. Pat. No. 5,660,974 issued Aug. 26, 1997 to Marrese et al., U.S. Pat. No. 5,646,327 issued Jul. 8, 1997 to Burns et al.; and U.S. Pat. No. 5,827,635, issued Oct. 27, 1998 to Cole; and U.S. Pat. No. 5,709,982, referenced previously, the disclosures of which are all incorporated herein by reference with respect to antioxidants. Also useful as antioxidants are 1,4-cyclohexanediones as described in U.S. Pat. No. 6,077,653, issued Jun. 20, 2000 to McGarry et al.

Buffering agents are generally present in the color developing compositions used in this invention to provide or maintain the desired alkaline pH of from about 9 to about 12, and more preferably from about 9 to about 11. Useful buffering agents include, but are not limited to carbonates, borates, tetraborates, glycine salts, triethanolamine, diethanolamine, phosphates and hydroxybenzoates. Alkali metal carbonates (such as sodium carbonate, sodium bicarbonate and potassium carbonate) are preferred buffering agents. Mixtures of buffering agents can be used if desired. In addition to buffering agents, pH can also be raised or lowered to a desired value using one or more acids or bases. It may be particularly desirable to raise the pH by adding a base, such as a hydroxide (for example sodium hydroxide or potassium hydroxide).

The solution can also include one or more of a variety of other addenda which are commonly used in such compositions, such as alkali metal halides (such as potassium chloride, potassium bromide, sodium bromide and sodium iodide), metal sequestering agents (such as polycarboxylic or aminopolycarboxylic acids or polyphosphonates), antifoggants, development accelerators, optical brighteners, wetting agents, stain reducing agents, surfactants, and defoaming agents.

The color developing composition is preferably formulated and used as an aqueous solution, either as the working developer solution or as a replenishing solution. However, as is known in the art (see for example: U.S. Pat. No. 5,362,610, issued Nov. 8, 1994 to Yoshimoto; U.S. Pat. No. 5,376,509, issued Dec. 27, 1994 to Yoshimoto et al.; and EP 0 611 986A 1, published Aug. 24, 1994), they can also be formulated and used as dry tablets. Developers can be delivered to the processor as single part solutions, multiple part solutions, gels, powders, crystalline suspensions, tablets and solutions.

In the method of the invention the photographic element is contacted with the color developer for up to 120 seconds, with a time of from about 20 to about 120 seconds being preferred. More preferably the photographic element is contacted with the color developer for 100 seconds or less and most preferably for 70 seconds or less. For rapid color development, the processing temperature is generally from about 40 to about 65° C., preferably from about 45 to about 65° C., and more preferably from about 45 to about 60° C.

Following color development, one or more processing steps are performed to stop the action of the color developer, oxidize metallic silver, and dissolve the oxidized silver and undeveloped silver halide and remove the silver from the photographic element. These functions may be performed by one or more processing solutions or compositions, including stop solutions or compositions, stop-fixer solutions or compositions, bleach solutions and compositions, fixer solutions and compositions, and bleach-fixer solutions and compositions. These solutions may be contacted with the photographic film with or without separating prior processing compositions from the material.

Stop solutions and compositions are solutions and compositions with a pH of from about 2 to about 8, generally containing buffers or acids, that lower the pH of the photographic element causing development to stop and image-dye forming reactions to stop. Stop treatments, when used, follow a development step. Buffers and acids used to formulate stop solutions and compositions include acetic, succinic, glycolic, sulfamic, sulfuric, and phosphoric acids, bisulfite and bisulfate salts, imidazole and the like. Stop solutions and compositions containing one or more fixing agents can be particularly effective. Stop solutions and compositions may also contain one or more bleaching agents thereby having the ability to stop development and also to effect bleaching or bleach-fixing if desired. Stop treatments are generally performed for at least about 10 seconds at from about 20 to about 65° C.

Photographic bleaching is carried out in one or more steps using one or more photographic bleaching agents in a bleaching solution or composition. Such bleaching agents may include strong oxidizing agents such as permanganate, ferricyanide salts, Fe(III) salts such as ferric chloride, persulfate salts, periodate salts, and hydrogen peroxide or compounds that generate hydrogen peroxide such as perborate or percarbonate salts. Other very useful bleaching agents include Fe(III) complexes of carboxylic acids such as aminopolycarboxylic acid or polyaminopolycarboxylic acid chelating ligands.

Useful iron-ligand complexes comprise one or more polycarboxylic acid chelating ligands. Particularly useful chelating ligands include conventional polyaminopolycarboxylic acids including ethylenediaminetetraacetic acid and others described in *Research Disclosure*, publication 38957; U.S. Pat. No. 5,334,491, issued Aug. 2, 1984 to Foster et al.; U.S. Pat. No. 5,582,958 issued Dec. 10, 1996 to Buchanan et al.; and U.S. Pat. No. 5,753,423 issued May 19, 1998 to Buongiorne et al. There are hundreds of possible chelating ligands that are known in the art, the most common ones being ethylenediaminetetraacetic acid (EDTA), 1,3-propylenediaminetetraacetic acid (PDTA), diethylenetriaminepentaacetic acid (DTPA), cyclohexanediaminetetraacetic acid (CDTA) and hydroxyethylethylenediaminetriacetic acid (HEDTA).

Biodegradable chelating ligands are particularly desirable in order to minimize the impact on the environment from discharged photoprocessing solutions. One particularly useful biodegradable chelating ligand is ethylenediaminedisuccinic acid (EDDS) as described in U.S. Pat. No. 5,679,501 issued Oct. 21, 1997 to Seki et al., and EP 0 532 003 B1, Ueda et al., published Jun. 17, 1998. All isomers of EDDS are useful, including the [S,S] isomer, and the isomers can be used singly or in mixtures. The [S,S] isomer is most preferred in the iron-EDDS complexes. Other useful disuccinic acid chelating ligands are described in U.S. Pat. No. 5,691,120 issued Nov. 25, 1997 to Wilson et al.

Aminomonosuccinic acids (or salts thereof) are chelating ligands having at least one nitrogen atom to which a succinic acid (or salt) group is attached. These chelating ligands are also useful in iron complexes. U.S. Pat. No. 5,652,085 issued Jul. 29, 1997 to Wilson et al. and U.S. Pat. No. 5,585,226 issued Dec. 17, 1996 to Strickland et al., also provide more details about such chelating ligands, particularly the polyamino monosuccinic acids. Ethylenediamine monosuccinic acid (EDMS) is preferred in this class of chelating ligands.

Other classes of biodegradable aminopolycarboxylic acid or polyaminopolycarboxylic acid chelating ligands that can be used to form biodegradable iron complexes include iminodiacetic acid and its derivatives (or salts thereof), including alkyliminodiacetic acids that have a substituted or unsubstituted alkyl group having 1 to 6 carbon atoms (such as methyl, ethyl, n-propyl, isopropyl, and t-butyl) as described in EP 0 534 086 B1, Kuse et al., published Mar. 25, 1998, and U.S. Pat. No. 5,693,456 issued Dec. 2, 1997 to Foster et al. Particularly useful alkyliminodiacetic acids are methyliminodiacetic acid (MIDA) and ethyliminodiacetic acid (EIDA). MIDA is the most preferred.

All chelating ligands useful in this invention can be present in the free acid form or as alkali metal (for example, sodium and potassium) or ammonium salts, or as mixtures thereof.

The iron-ligand complexes useful in this invention can be binary complexes (meaning iron is complexed to one or more molecules of a single chelating ligand) or ternary complexes in which iron is complexed to molecules of two distinct chelating ligands similar to iron complexes described for example in U.S. Pat. No. 5,670,305 issued Sep. 23, 1997 to Gordon et al., and U.S. Pat. No. 5,582,958 (noted above). A mixture of multiple binary or ternary iron. complexes also can be present in the compositions.

Still other useful biodegradable iron chelating ligands include but are not limited to, alaninediacetic acid, β-alaninediacetic acid (ADA), nitrilotriacetic acid (NTA), glycinesuccinic acid (GSA), 2-pyridylmethyliminodiacetic acid (PMIDA), 2,6-pyridinedicarboxylic acid (PDCA), citric acid, and tartaric acid.

Bleaching agents and compositions may be combined with fixing agents and compositions to form bleach-fixing compositions. When using bleaching compositions in single-use processing methods, strong oxidizing agents such as Fe(III)PDTA or $Fe(III)(MIDA)_2$, can be used in combination with fixing agents to form single-use bleach-fixing compositions, as described in U.S. Ser. No. 09/705,404 filed Nov. 3, 2000 by Brown et al. Multiple bleaching agents can be present if desired.

The total amount of bleaching agent(s) in the bleaching composition is generally at least 0.05 mol/l, and preferably at least 0.1 mol/l. These amounts would apply to bleach-fixing compositions also.

Other components of the bleaching composition may include buffers, halides, corrosion inhibiting agents, metal ion sequestering agents, and bleaching accelerators of which a large number are known in the art. Bleaching compositions intended only to oxidize metallic silver and not to fix it generally contain a halide salt such as a chloride or bromide salt to form silver chloride or silver bromide from the oxidized silver. Bleach-fixing compositions may contain such halides, including iodide salts, but they are not necessary. These and other components and conventional amounts are described in the references above. The pH of the bleaching composition is generally from about 3 to about 7.0. Buffers and acids that may be useful to control bleach solution pH include carboxylic acid buffers such as acetic, succinic, sulfosuccinic, and glycolic acids, sulfamic and sulfuric acids, phosphoric acid and phosphate salts; bisulfite and bisulfate salts, imidazolium salts, and the like.

The components of photographic bleaching compositions can be mixed together in any suitable order as would be known in the art, and stored for a time or used immediately as liquid or solid formulations. They can be formulated in aqueous concentrates such that dilution up to 10 times is required before or during use. Alternatively, they can be formulated as solid compositions (tablets, pellets, powders or granules) and added to a processing tank with appropriate amounts of water for use.

A bleaching step can be generally carried out at a temperature of from about 20 to about 65° C. (preferably from about 30 to about 60° C.). The time of processing during this bleaching step is generally up to 360 seconds and preferably at least 10 and up to 240 seconds (more preferably from about 10 to about 120 seconds).

The bleaching or bleach-fixing step can be preceded by a treatment with a composition or solution containing a bleach accelerator if desired. Such accelerators include organic thiols such as mercaptotriazole, thioglycerol, substituted and unsubstituted aminoalkanethiols, iodide salts, and the like. Compounds that release such accelerators during processing such as thiolisothiouronium salts are also useful.

Fixing solutions and compositions contain one or more fixing agents. A wide variety of fixing agents and silver solvents are known, as described for example in U.S. Pat. No. 5,633,124, referenced above, and publications noted therein. Examples of photographic fixing agents include, but are not limited to, thiosulfates (for example sodium thiosulfate, potassium thiosulfate and ammonium thiosulfate), thiocyanates (for example sodium thiocyanate, potassium thiocyanate and ammonium thiocyanate), thioethers (such as ethylenebisthioglycolic acid and 3,6-dithia-1, 8-octanediol), imides and thiourea. Thiosulfates and thiocyanates are preferred, and thiosulfates are more preferred. Ammonium thiosulfate is most preferred. The general amount of total fixing agents in the fixing composition at least 0.001 mol/l, and preferably at least 0.1 mol/l. These amounts would apply to bleach-fixing compositions also.

Thiosulfate salts are generally preferred as fixing agents because they are inexpensive, highly water soluble, non-toxic, non-odorous, and stable over a wide pH range. Thus, fixing is usually accomplished using a thiosulfate fixing agent that diffuses into the photographic element, and forms silver thiosulfate complex that diffuses out of the photographic element. The thiosulfate can be any of sodium thiosulfate, potassium thiosulfate, ammonium thiosulfate, lithium thiosulfate, calcium thiosulfate, or magnesium thiosulfate, or mixtures thereof such that a desired concentration of thiosulfate ion is provided. Preferably, ammonium thiosulfate or sodium thiosulfate (or a mixture thereof) is used. For rapid fixing, ammonium thiosulfate is preferably used.

Optionally, one or more thiocyanate fixing agents can also be present as a fixing agent especially for more rapid silver removal. If present, it can be provided as sodium thiocyanate, potassium thiocyanate or ammonium thiocyanate, or mixtures thereof Preferably ammonium or sodium thiocyanate (or mixtures thereof) is used. The thiosulfates and thiocyanates can be obtained from a number of commercial sources or prepared using conventional starting materials and synthetic procedures.

It is also known to use fixing accelerators in fixing compositions. Representative fixing accelerators include, but are not limited to, ammonium salts, guanidine, ethylenediamine and other amines, quaternary ammonium salts and other amine salts, thiourea, thioethers, thiols and thiolates. Examples of useful thioether fixing accelerators are described in U.S. Pat. No. 5,633,124, referenced above, incorporated herein for the teaching of fixing compositions.

Fixing compositions generally contain one or more monovalent or divalent cations supplied by various salts used for various purposes (for example, salts of fixing agents). It is preferred that the cations be predominantly ammonium cations, that is at least 50% of the total cations are ammonium ions. Such fixing compositions are generally known as "high ammonium" fixing compositions.

Fixing compositions are generally buffered to a pH of from about 4 to about 8 using buffering agents such as acetic acid, succinic acid, maleic acid, sulfosuccinic acid, phthalic acid and imidazole. They also usually include sulfite ions to serve as a silver halide solvent, to help control pH, and to act as a preservative. Useful salts that provide sulfite ions include but are not limited to sodium sulfite, potassium sulfite, ammonium sulfite, sodium bisulfite, sodium metabisulfite, potassium metabisulfite, and mixtures of such salts such that the desired sulfite concentration is obtained.

Optional addenda that can be present in the photographic fixing composition if desired are materials that do not materially affect its photographic fixing function. Such materials include, but are not limited to, biocides, alkyl or arylsulfinic acids or their salts, halides (such as chloride ions, or low concentrations of bromide or iodide ions), photographic hardeners, conventional buffering agents (such as acetic acid or succinic acid), metal ion sequestering agents (such as polycarboxylic acids, polyaminopolycarboxylic acids, and polyphosphonic acids), fixing accelerators, and other materials readily apparent to one skilled in the photographic art. These and other optional materials can be present in conventional amounts; for example as described in U.S. Pat. No. 5,633,124 noted above.

Other details of fixing compositions not explicitly described herein are considered well known in the art, and are described for example, in *Research Disclosure* publication 38957 (noted above); U.S. Pat. No. 5,424,176 issued Jun. 13, 1995 to Schmittou et al, U.S. Pat. No. 4,839,262 issued Jun. 13, 1989 to Schwartz; U.S. Pat. No. 4,921,779 issued May 1, 1990 to Cullinan et al., U.S. Pat. No. 5,037,725 issued Aug. 6, 1991 to Cullinan et al., U.S. Pat. No. 5,523,195, issued Jun. 4, 1996 to Darmon et al., U.S. Pat. No. 5,552,264, issued Sep. 3, 1996 to Cullinan et al., all incorporated herein by reference for their teaching of fixing compositions.

The components of photographic fixing compositions can be mixed together in any suitable order as would be known in the art, and stored for a time or used immediately as liquid or solid formulations. They can be formulated in aqueous concentrates such that dilution up to 10 times is required before or during use. Alternatively, they can be formulated as solid compositions (tablets, pellets, powders or granules) and added to a processing tank with appropriate amounts of water for use. This also applies to bleach-fixing compositions.

A fixing step can be generally carried out at a temperature of from about 20 to about 65° C. (preferably from about 30 to about 60° C.). The time of processing during this fixing step is generally up to 360 seconds and preferably at least 10 and up to 240 seconds (more preferably from about 10 to about 120 seconds). This also applies to a bleach-fixing step.

Stabilizing or rinsing compositions can include one or more surfactants, and in the case of stabilizing compositions, a dye stabilizing compound such as a formaldehyde precursor, hexamethylenetetraamine or various other aldehydes such as m-hydroxybenzaldehyde. Useful stabilizing or rinsing compositions are described in: U.S. Pat. No. 4,859,574 issued Aug. 22, 1989 to Gormel; U.S. Pat. No. 4,923,782 issued May 8, 1990 to Schwartz; U.S. Pat. No. 4,927,746 issued May 22, 1990 to Schwartz, U.S. Pat. No. 5,278,033 issued Jan. 11, 1994 to Hagiwara et al.; U.S. Pat. No. 5,441,852 issued Aug. 15, 1995 to Hagiwara et al., U.S. Pat. No. 5,529,890 issued Jun. 25, 1996 to McGuckin et al.; U.S. Pat. No. 5,534,396 issued Jul. 9, 1996 to McGuckin et al.; U.S. Pat. No. 5,578,432 issued Nov. 26, 1996 to McGuckin et al.; U.S. Pat. No. 5,645,980 issued Jul. 8, 1997 to McGuckin et al.; and U.S. Pat. No. 5,716,765 issued Feb. 10, 1998 to McGuckin et al., all incorporated herein by reference.

A stabilizing or rinsing step can be generally carried out at a temperature of from about 20 to about 65° C. (preferably from about 30 to about 60° C.). The time of processing during this stabilizing or rinsing step is generally up to 360 seconds and preferably at least 10 and up to 240 seconds (more preferably from about 10 to about 120 seconds).

According to the present invention, the historical classification of a film family as the group of films processed in a common, standardized processing cycle is modified. Rather than focus on the process, we define the film family based on the film's use such as the family of color negative films used in still photography. We separate film members within this family classification based on processing profiles. According to the present invention, we describe a method of processing photographic film images, comprising the steps of: a) providing a film processor having a plurality of adjustable parameters for a given process for processing a family of photographic films; b) defining a plurality of processing profiles having different values of the adjustable parameters for different members of the film family, and c) chemically processing a photographic film that is a member of the film family using the processing profile for that family member. A preferred embodiment focuses on the family of films known collectively as color negative films used in still photography. The processing profile may be customized for one film or may be useful for a number of films. These processing profiles may be used to provide, for example, near real time processing, low chemical consumption, or low energy utilization. In our preferred embodiment, these processing profiles are used for near real time processing of color negative films used in still photography.

According to the present invention, a film manufacturer can specify the processing steps, such as color development, bleaching, fixing, bleach-fixing, and/or stabilizing (or rinsing) and/or solution compositions for these processing steps that are demanded for a desired film formulation in order for that formulation to meet optimized performance positions that are not attainable through a standardized process sequence using conventional processors or to meet different desired performance positions as a result of such process changes. Our focus for the present invention is on a rapid process cycle because of the added advantages accrued versus the advent of digital photography. Therefore, according to the present invention, the processing steps, such as color development, bleaching, fixing, bleach-fixing, and/or stabilizing (or rinsing) are shorter than conventional times. The solution compositions for these processing steps may be more concentrated in certain constituents than conventional processing solution compositions. The solution temperatures for these processing steps may be higher than conventional processing solution temperature. The processing methods can have any of a wide number of arrangements of steps, as described for example in U.S. Pat. No. 5,633,124 (noted above) that is incorporated herein by reference.

In rapid processing methods, the total processing time for color negative films can be up to 240 seconds (preferably from about 60 to about 200 seconds). The rapid processing examples herein are capable of producing an archival negative, however, the resulting negative will often not be suitable for making an optical print using conventional photographic printers. An acceptable print is made according to the present invention by scanning the processed films to produce a digital image and processing the digital image to correct for differences between the system and standard contrast and film speed. The resulting processed digital image can then be printed using a digital printer to produce an acceptable photographic print.

Figure 2:
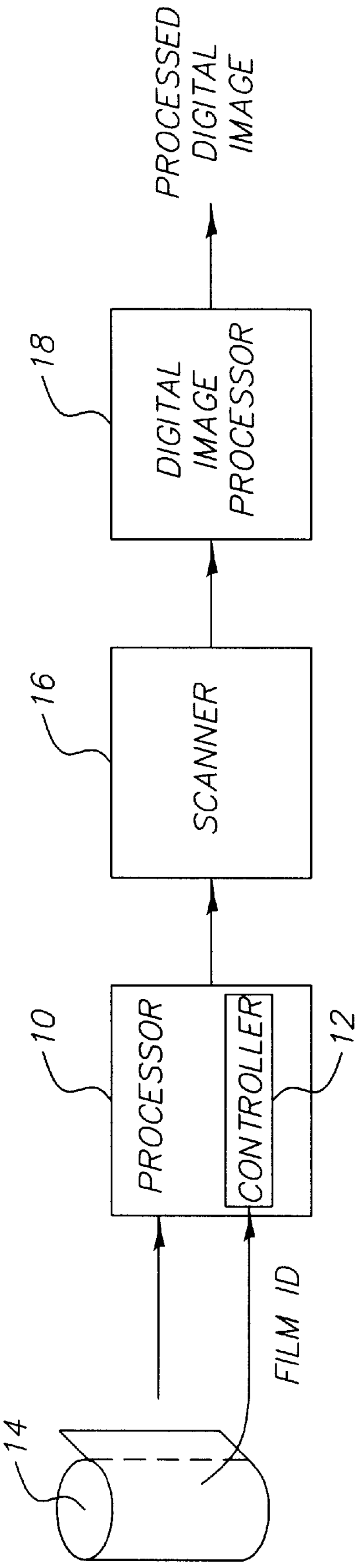
FIG. 2 is a schematic block diagram of a system useful in performing the method of the present invention.

Referring to FIG. 2, a photofinishing system useful in providing near real time film processing according to the present invention includes a low volume film processor 10 having a controller 12 that is capable of controlling a plurality of adjustable parameters for a given process for processing a family of photographic films. A plurality of processing profiles having different values of the adjustable parameters for different members of the film family are stored in the controller 12. The processing profiles define the adjustable parameters to independently adjust the processing steps to yield a process for each member of the film family that produces stable film densities that can be corrected by digital processing to produce an acceptable print. A given processing profile is selectable by a film identifier (film ID) for a roll of film 14 that is to be processed. The film may be loose roll, in cassettes such as 35 mm or 24 mm, or be extracted from a single use camera. The film identifier may be manually input by an operator, or automatically input by a reader in the film processor that reads the film identifier from a container of the film 14. The processing profiles are designed to produce system film contrast that is between 25% and 130%, and a system film speed loss that is no greater than 0.15 logE of the contrast and speed, respectively, of a standard chemical process for the film family. According to the present invention, at least one of the processing profiles will not produce the stable densities, system contrast and/or speed with at least one member of the film family.

A scanner 16 scans the processed films to produce digital images. A digital image processor 18 processes the digital images to correct for differences between the contrast and film speed produced by the processor 10 and a standard chemical process. Scanning could occur during the wet chemical processing of the film or at the end of the processing cycle when the film is still in the processing container or when the film is removed from the processing container. Using the photofinishing system of FIG. 2 according to the present invention, it is possible to obtain digital images that can be employed to make prints having quality comparable to that produced by a conventional process while minimizing processing time, through the independent adjustment of each processing step based on the processing characteristics of the input film. Alternatively, the film manufacturer can specify the desired reference performance position of a film formulation by separately providing correction factors for the film that render the scanned image improved over that obtained by a standard chemical process.

Scanners suitable for use with the present invention are described generally by J. R. Milch in Chapter 10 of the textbook: *Image Processes and Materials*, Neblette's Eighth Edition, 1989. The general types of scanners include, but are not limited to, flat-bed and drum microdensitometers, laser flying-spot scanners, CRT flying-spot scanners, multiple-detector focal plane scanners, linear film scanners, and area film scanners. The scanner can scan the whole film or an individual frame or frames. The scanner may be included in a cabinet along with the processor or may be a modular peripheral component of the system. The film 14 may be provided to the scanner 16 from the processor 10 in a number of ways including the use of take-up reels, festoons, cassettes, a turret for multiple festoons, removable festoons, or a dry slack box. Preferred methods of providing the film to the scanner are described in co-pending application U.S. Ser. No. 10/027,382, filed Dec. 21, 2001 by Piccinino et al. The scanner 16 may also include an input slot for previously processed film so that reorders can easily be made.

The digital image processing performed by the digital image processor 18 corrects for contrast and densities that may be too high or too low relative to a standard chemical process. It also corrects for mismatches in the contrast of the red, green and blue color records. These digital corrections can be implemented by one or more 1-dimensional look-up tables (1DLUTs), 2-dimensional look-up tables (2DLUTs), 3-dimensional look-up tables (3DLUTs), higher dimensional look-up tables, matrices, or any combination thereof.

The specific digital image processing transform required for this system have been taught elsewhere in the art. In U.S. Pat. No. 5,267,030 issued Nov. 30, 1993 to Giorgianni et al., describes a method and means for improving the calibration of color imaging systems. Additionally, they showed how novel calibration of color imaging systems, such as the one described herein, achieve media compatibility for subsequent imaging applications. In their method, combinations of 1DLUTs, 3DLUTs, and/or matrices are used to transform RGB image-bearing signals, such as the output from a scanner, into R'G'B' signals for a reference image-capturing system. For the system described herein, we use the RGB image-bearing signals from a comparable piece of film processed through the standard chemical process as the reference image-capturing system.

In U.S. Pat. No. 5,667,944, issued Sep. 16, 1997 to Reem et al. describe a method for correcting the response of a photographic film for many sources of variation. The sources of variation cited include photographic chemical processing. Photographic film response is strongly dependent upon the condition of the chemical processing, including the chemical composition, the agitation, and the chemical processing temperature. Reem et al. cites use of two or more reference patches as the source of RGB image-bearing signals from which they derive the proper digital correction. In the system described herein, reference patches may be used, or, if the system is sufficiently robust, then an independent measurement of the RGB image bearing signals may be made, and the transforms to the reference image-capturing system can be derived. The digital correction transforms are again described as combinations of 1DLUTs, 3DLUTs, and/or matrices.

In U.S. Pat. No. 5,804,356, Cole et al. describe the digital correction of film chemically processed rapidly. The digital corrections are designed to correct for either or both inter-image interactions and gamma mismatches among at least two color records. A standard chemical process is cited as the reference system from which the digital corrections are derived. Corrections are described as matrices, 1DLUTs, or higher order transformations.

Specifically, we have found the following steps are useful in deriving digital correction transforms for correcting images made on a given photographic film type chemically processed and scanned through the system described herein:

1) a matched set of neutral and colored exposures is made on a given photographic film type, one set processed and scanned using the system of this invention and a second set processed and scanned using the reference image-capturing system, producing corresponding sets of R, G, and B image signals;

2) a set of three 1DLUTs is derived by which each of the R, G, and B image signals of a neutral tone scale produced by the system of this invention is mapped to a single reference neutral tone scale, preferably the neutral tone scale defined by the G image signals of the reference system, 3) a set of three 1 DLUTs is derived by which each of the R, G, and B image signals of a neutral tone scale produced by the reference system is mapped to the same reference neutral tone scale used in step 2);

4) a matrix, low order multinomial, or 3DLUT is derived which maps the R, G, and B image signals of the film processed through the system of this invention and transformed through the 1DLUTs derived in step 2) to the corresponding R, G, and B image signals for the film processed through the reference system and transformed through the 1DLUTs derived in step 3), said matrix, low order multinomial, or 3DLUT designed to minimize the differences between the respective transformed R, G, and B image signals;

5) a set of 1DLUTs is derived by which the reference neutral tone scale used in step 2) is mapped to the neutral tone scales defined by the R, G, and B image signals for the film processed through the reference system;

A digital transform defined by application of the transforms derived in steps 2), 4), and 5) in succession to R, G, and B image signals is effective in correcting images made on a given photographic film type chemically processed and scanned through the system of this invention. By following the procedure outlined above, digital transforms appropriate for each member of a film family are derived which result in digital images substantially free of tone scale and color differences from digital images obtained using the reference image-capturing system.

We have found that the digital correction performed by the digital image processor 18 can amplify certain digital artifacts, which in the absence of the digital correction would not have been visible or at least not objectionable in a final rendered image. When the digital corrections are employed to increase the contrast, artifacts such as scanner quantization and scanner uniformity are enhanced, and may be objectionable in the final rendered image. When the digital corrections are employed to decrease the contrast, artifacts such as scanner noise are enhanced, and may be objectionable in the final rendered image. There is a need therefore for imposing limits on the processing profiles used in the processor 10 such that the amount of correction that must be performed by the digital image processor 18 does not result in images having objectionable artifacts.

The amplification level of the digital correction can be expressed as a contrast factor. In a 1DLUT, this would be the average contrast of the 1DLUT for each color record. In a 3DLUT, this would be the average contrast of the neutral scale for each color record. In a matrix, this would be the magnitude of the singular values of the matrix. In an embodiment in which several nonlinear transformations are applied in seriatim, singular values of a matrix representing a linearization of the mapping near representative points may be used. The higher the level of a contrast factor, the higher the amplification of digital artifacts. For near real time processing that generates low contrast images, the digitally enhanced contrast lowers the effective scanner bit depth. Low effective scanner bit depth causes quantitization in the final image, which reduces the image quality of the final image. Preferably, the near real time processing results in image contrast that is greater than 25% of that of a standard chemical process. It is more preferred that this image contrast is more than 40% of that of the standard chemical process. It is most preferred that this image contrast is more than 60% of that of the standard chemical process.

For near real time processing that generates high contrast images, the digitized contrast is limited by the dynamic range of the scanner 10. For example, if the contrast of the film is increased by 30% over that of the standard chemical process, the dynamic range that is renderable by the system is reduced by 3 stops. The amount of increased scanner noise due to the high contrast of the image depends upon the particular scanner model, but an increase in scanning noise always occurs as the dynamic range limit of the scanner is approached. Accordingly, it is preferred that the near real time processing results in an image contrast that is less than 130% of that of the standard chemical process. It is more preferred that this image contrast is less than 120% of that of the standard chemical process. It is most preferred that this image contrast is less than 110% of that of the standard chemical process.

Figure 3:
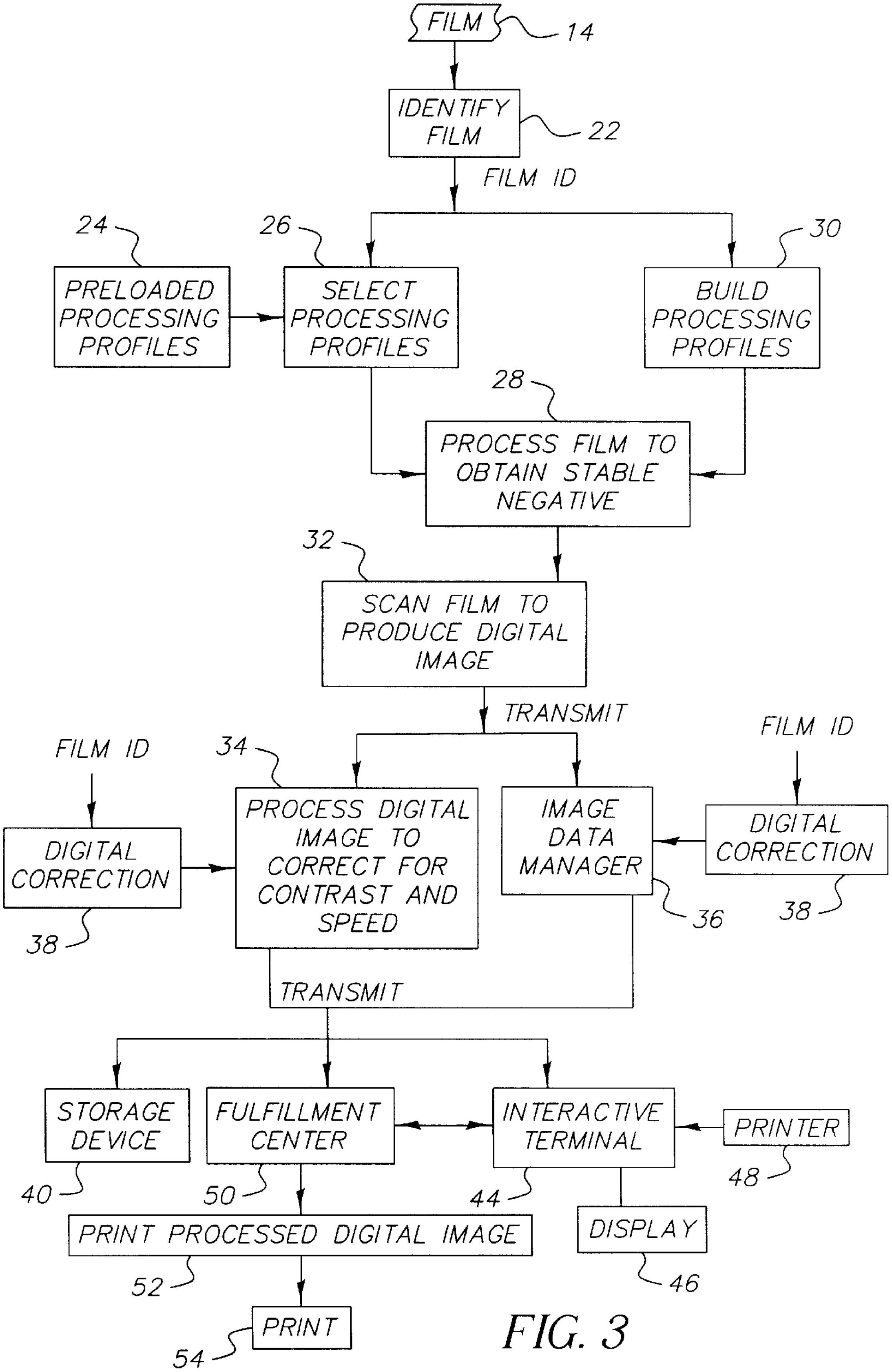
FIG. 3 is a flow chart illustrating the steps of the present invention.

Referring to FIG. 3, the method of the present invention includes the following steps. Film 14 is received for processing. The film 14 may be in cassettes such as 35 mm or 24 mm or be extracted from a single use camera. The film is identified 22 either by manual operator input or by automatic input using a reader in the film processor that reads the film identifier from the film container. Either route can generate a simple film identification code FilmID. A plurality of processing profiles 24 having different values of the adjustable parameters for different members of the film family are preloaded in the controller 12 of the processor 10. These processing profiles may be stored inn the controller at the time of manufacture, stored on the controller at the time the controller is installed using such devices as a CD reader, or may be periodically downloaded and updated from an Internet accessible site. The Film ID is used to select 26 a preloaded processing profile that is then used by the processor 10 to process 28 the film to obtain a stable negative.

If an automatic reader is used, the FilmID can include more complex information exchange. The information exchange may occur via a conventional 1-dimensional DX coding or via 2-dimensional DX coding or by directed access to a film manufacturer's Internet site from which processing information is downloaded. The manufacturer's customized processing profile can then be obtained 30 and used by the processor 10 to process 28 the film in order to obtain a stable negative The stable negative is then scanned 32 to produce a digital image. This digital image may then be processed 34 in digital image processor 18 to correct for contrast, speed, and color. Alternatively, the digital image correction can be transmitted to a remote Image Data Manager 36 for digital image correction. In either case, digital correction factors 38 are required for each film based on the FilmID. These correction factors may be preloaded in the digital image processor 18, or in the remote Image Data Manager 36 as was the case for the preloaded processing profiles or, if an automatic reader is used, the FilmID can include the corresponding correction factors for the manufacturer's specification of the processing profile. After performing the digital correction, the digital image may be stored, displayed, and/or outputted in a multitude of ways. Storage of the digital image may be on a storage device 40 such as a compact disk, floppy disk, flash memory, microdrive, memory stick, etc. using devices directly attached to or remotely connected to the digital image processor 18, or Image Data Manager 36. Storage can also be affected by sending the processed digital image via the Internet to an address accessible to a consumer for downloading and storing on their personal computer. The digital image may be transmitted to an interactive terminal 44 where it can be displayed on a display device 46 such as a cathode ray tube display, liquid crystal display, organic light emitting diode display, polymeric light emitting diode display, rear-projection, plasma display panel, electroluminescent display, image light amplifier, digital micro mirror devices, laser display, light emitting polymer, light emitting diode, ferro electric display, or a field emission display. The customer can use the terminal 44 to select desired images for printing on a printer 48 located either at the site of the terminal 44 or remotely attached thereto. The printer can be a silver halide printer, inkjet printer, thermal printer, electrophotographic printer, Thermoautochrome printer, Cycolor printer, microdry/wax transfer printer, and the like. The processed digital images can be transmitted to a fulfillment center 50, from which prints 54 or image bearing articles can be ordered and produced 52.

Transmission of the digital image from the scanner to the image data manager 36, storage device 40, fulfillment center 50 and/or interactive terminal 44 may take place via a USB connection, Firewire (IEEE 1394), IR, RF, serial, modem, Bluetooth, wireless LANS, wireless broadband, cable, DSL, fiber, and the like.

The photographic processing method of this invention can be incorporated into multiple different types of customer use systems. This could be automated and integrated into a kiosk that is not assisted by any operator. Since the novel process and the digital correction are film type dependent, this method can be highly automated, which is a requirement for such a customer operated kiosk system. Under certain circumstances, customers prefer to have operator assistance, so the method of this invention could be integrated into a kiosk that requires operator assistance. The method of this invention could also be integrated into a larger or more complicated system that requires operator maintenance and control. Such systems are typically run as walk-up services available at photofinishing counters.

EXAMPLE 1

We demonstrate that a shorter development time than used in the standard C-41 process can be used to obtain the desired relative speeds and relative contrasts for members of a color negative film family. To achieve near real time processing it is desirable to minimize the overall processing time. The 195 seconds development time of the current standard C-41 process is the longest single processing time in this standard process cycle. Therefore, shortening the development time for this single step would be useful in achieving the near real time processing that we seek. We demonstrate that the near real time processing development time of 70 seconds is satisfactory for most films in this film family at the processing temperature of 46° C. with Color Developer A, Table 1.

TABLE 1

| Component (units are grams per Liter) | Dev A | Dev B | Dev C | Dev D |
|---|---|---|---|---|
| Sodium Sulfite, anhydrous | 8.0 | 6.0 | 9.23 | 10.53 |
| Sodium Bromide | 2.9 | 2.1 | | 2.80 |
| Sodium Carbonate, monohydrate | 28.0 | 26.9 | | 35.9 |
| 4-amino-3-methyl-N-ethyl-(2-hydroxyethyl)aniline sulfate (CD-4) | 6.75 | 6.75 | 15 | 15 |
| Hydroxylamine sulfate (HAS) | | | | 3.0 |
| PVP | | | 3 | 3.0 |
| Antical-8 (40% solution) | | | | 6.5 |
| Potassium Sulfite, anhydrous | | | | |
| Potassium Bromide | | | 2.5 | |
| Potassium Iodide | | | | 0.002 |
| Potassium Carbonate, anhydrous | | | | |
| pH | 10.1 | 10.1 | 10.3 | 10.48 |

Table 1 shows the range of developer compositions that can be used in a film processor having a plurality of adjustable parameters.

TABLE 2

| Mfg | Product Name | Relative Red Speed | Relative Green Speed | Relative Blue Speed | Relative Red Best Fit Slope | Relative Green Best Fit Slope | Relative Blue Best Fit Slope |
|---|---|---|---|---|---|---|---|
| KODAK | GOLD 100 | 106 | 100 | 104 | 60 | 61 | 73 |
| | GOLD 200 | 111 | 102 | 109 | 66 | 67 | 80 |
| | MAX 800 | 115 | 111 | 101 | 56 | 70 | 67 |
| AGFA | VISTA 100 | 115 | 105 | 109 | 86 | 78 | 92 |
| | VISTA 200 | 117 | 102 | 113 | 84 | 78 | 91 |
| | VISTA 400 | 109 | 102 | 104 | 83 | 84 | 85 |
| | VISTA 800 | 117 | 97 | 96 | 83 | 78 | 89 |
| FUJI | SUPERIA 100 | 111 | 103 | 115 | 88 | 73 | 93 |
| | SUPERIA 200 | 116 | 98 | 93 | 77 | 75 | 92 |
| | SUPERIA 400 | 128 | 119 | 108 | 78 | 82 | 90 |
| | SUPERIA 800 | 109 | 100 | 100 | 67 | 68 | 81 |
| KONICA | CENTURIA 100 | 104 | 93 | 95 | 80 | 86 | 88 |
| | CENTURIA 200 | 111 | 98 | 100 | 81 | 85 | 88 |
| | CENTURIA 400 | 111 | 113 | 102 | 82 | 88 | 93 |
| | CENTURIA 800 | 98 | 98 | 96 | 74 | 75 | 67 |
| FERRANIA | SOLARIS 100 | 102 | 100 | 106 | 69 | 66 | 82 |
| | SOLARIS 200 | 106 | 101 | 109 | 72 | 65 | 88 |
| | SOLARIS 400 | 106 | 99 | 106 | 64 | 63 | 78 |
| | SOLARIS 800 | 106 | 87 | 98 | 62 | 56 | 69 |

Table 2 shows the signal-to-noise relative speed and best fit slope relative contrast response of films that were processed using Developer A for 70 seconds at 46C. The tabulated values are relative to the standard C-41 processing which uses a development time of 195 sec. We have assigned the speed at 0.15 above Dmin a point value of 100 for the C-41 processed film.

Numbers in the table that are less than 100 are associated with relative speeds that are slower than that of the standard C-41 chemical process. The best fit slope contrast response for the films used in this table is also referenced to the standard C-41 chemical process. The standard C-41 chemical process is given a value of 100 for its best fit slope contrast. Numbers in the table that are less than 100 are associated with contrasts that are lower than that of the standard C-41 chemical process. The data illustrate that at 70 seconds of development with Developer A at 46° C., all of the listed films have relative speeds that are faster than the relative speed of 85 (−0.15 logE) and have contrasts that are greater than 25% of that of the C-41 chemical process check. These films make up a group of films from the color negative film family that can be processed using a Processing Profile in which Developer A is used for 70 seconds at 46° C.

EXAMPLE 2

We demonstrate that we can improve the signal-to-noise of the information contained in a processed film by altering the development time to a time that is longer than a process time useful to process other members of the film family. In Example 1 we showed that the near real time processing development time of 70 seconds for a group of films from the color negative film family is satisfactory for most of the tested films at the processing temperature of 46° C. with Color Developer A.

TABLE 3

| Mfg | Product Name | Development Time (sec) | Relative Red Speed | Relative Green Speed | Relative Blue Speed | Relative Red Best Fit Slope | Relative Green Best Fit Slope | Relative Blue Best Fit Slope |
|---|---|---|---|---|---|---|---|---|
| FUJI | SUPERIA 1600 | 70 | 102 | 76 | 83 | 59 | 62 | 69 |
| | | 90 | 111 | 96 | 96 | 83 | 84 | 92 |

Table 3 shows the signal-to-noise relative speed and best fit slope relative contrast response of FUJI SUPERIA 1600 film that was processed using Developer A for 70 seconds at 46° C. The tabulated values are relative to the standard C-41 processing as described in Example 1. Table 3 shows that if the 70 seconds development time is used for FUJI SUPERIA 1600, this film, unlike the other members of the film family described in Example 1, has a relative green record speed that is −0.24 logE ((76–100)/100) slow of the C-41 reference process, an unacceptably large speed loss. FUJI SUPERIA 1600's green speed increases to just 0.04 logE ((96–100)/100) slow of the C-41 reference processed film when a near real time development process time of 90 seconds is used. A fixed time process cycle would be designed to work with all films. In this example, the development time would be 90 seconds rather than 70 seconds. The use of processing profiles provides a means to run the processor faster for those films that can be processed faster while still accommodating films within a film family that need longer process time.

EXAMPLE 3

The speed loss for FUJI SUPERIA 1600 high speed film at the nominal processing time of 70 seconds development in the near real time process is not necessarily a signature of high speed films. FERRANIA's low speed (SOLARIS 100) and high speed (SOLARIS 800) meet the speed requirements of matching the C-4 1 reference process at 70 seconds development, Example 1. However, we have learned that increasing the development time for the FERRANIA Solaris 800 from 70 seconds to 110 seconds with Developer A improves this film's performance relative to the 70 seconds development time, Table 4.

TABLE 4

| Mfg | Product Name | Development Time (sec) | Relative Red Speed | Relative Green Speed | Relative Blue Speed | Relative Red Best Fit Slope | Relative Green Best Fit Slope | Relative Blue Best Fit Slope |
|---|---|---|---|---|---|---|---|---|
| FERRANIA | SOLARIS 800 | 70 | 106 | 87 | 98 | 62 | 56 | 69 |
| | | 110 | 110 | 100 | 106 | 104 | 106 | 116 |

Table 4 shows that by increasing the time of development from 70 seconds to 110 seconds in Developer A at 46° C. we can produce better images in terms of signal-to-noise than obtained at shorter process times for our near real time process or with the standard C41 chemical process. Thus, a manufacturer recognizing this advantage could sell two versions of the same film formula, one for fast access and one for improved imaging performance and, by using unique film identification, can select the process treatment based on the performance intent a consumer had when purchasing the film. For some films listed in Example 1, the performance advantage described for FERRANIA SOLARIS 800 at longer times of development is already present when using Developer A at 46° C. for 70 seconds.

EXAMPLE 4

In this example we demonstrate that we can improve the signal-to-noise of the information contained in the processed film by altering the development time to a time that is shorter than a reference process time. In Example 1 we showed that the near real time processing development time of 70 seconds for a group of films from the color negative film family is satisfactory for most of the tested films at the processing temperature of 46° C. with Color Developer A.

TABLE 5

| Mfg | Product Name | Development Time (sec) | Relative Red Speed | Relative Green Speed | Relative Blue Speed | Relative Red Best Fit Slope | Relative Green Best Fit Slope | Relative Blue Best Fit Slope |
|---|---|---|---|---|---|---|---|---|
| KODAK | GOLD 200 | 70 | 111 | 102 | 109 | 66 | 67 | 80 |
| | | 55 | 124 | 105 | 114 | 51 | 48 | 63 |

Table 5 shows the signal-to-noise relative speed response of KODAK GOLD 200 Film to illustrate the advantage of a unique development time profile to achieve optimum performance at shorter times of development than the 70 seconds time if this time were recommended for a group of films from the color negative film family. Surprisingly, our processing chemistry can recover signal at even shorter processing times as illustrated by the 55 seconds time of development data. The digital correction capability that we use to correct for non-standard processing allows the process to be operated at optima specific for a film formulation. The speed metric can be used to guide the selection of the development processing time for our near real time processing systems to accommodate selected films that are disadvantaged when processed at conditions that are optimal for the majority of the available color negative films.

EXAMPLE 5

In this example we illustrate how the process can be adjusted to overcome performance limitations of other system components. For instance, scanners have different intrinsic performance features that can affect the final image quality such as when the digital corrections are employed to increase the contrast, artifacts such as scanner quantization are enhanced, and may be objectionable in the final rendered image. The processing profile can be used to specify processing conditions that can overcome some of these component limitations. In this example Developer B is used for 60 seconds at three different temperatures to process KODAK MAX 800 color negative film, Table 6.

TABLE 6

| Mfg | Product Name | Development Temperature (C.) | Relative Red Speed | Relative Green Speed | Relative Blue Speed | Relative Red Best Fit Slope | Relative Green Best Fit Slope | Relative Blue Best Fit Slope |
|---|---|---|---|---|---|---|---|---|
| KODAK | MAX 800 | 43.4 | 98 | 109 | 102 | 43 | 40 | 57 |
| | | 49 | 99 | 100 | 106 | 62 | 67 | 83 |
| | | 54.6 | 96 | 64 | 85 | 96 | 109 | 112 |

Table 6 shows that increasing the temperature from 43.4 C. to 54.6 C. the relative contrasts of the red, green and blue color records increased from approximately 40% of that obtained in a standard C-41 chemical process to 112%. Thus it is possible to change the development processing profile in order to change the nature of the scanned image. In this example, we demonstrate how we can increase the contrast of the film. This example also shows that there are limits to such changes. The process at 54.6° C. with Developer B is not acceptable by our standards because of the excessive relative green speed loss.

EXAMPLE 6

In this example we illustrate how a change in the developer composition can, along with shorter process times, overcome the speed loss illustrated in Example 5. In this example Developer C is used for 30 seconds at three different temperatures, Table 7.

TABLE 7

| Mfg | Product Name | Development Temperature (C.) | Relative Red Speed | Relative Green Speed | Relative Blue Speed | Relative Red Best Fit Slope | Relative Green Best Fit Slope | Relative Blue Best Fit Slope |
|---|---|---|---|---|---|---|---|---|
| KODAK | MAX 800 | 51 | 103 | 100 | 101 | 36 | 65 | 84 |
| | | 55 | 101 | 100 | 95 | 49 | 88 | 98 |
| | | 59 | 100 | 97 | 75 | 63 | 97 | 101 |

Table 7 shows that a different developer formulation (Developer C) and shorter processing times (30 seconds in the Developer C) can overcome the speed losses that occurred with Developer B at 54.6° C. and 60 seconds development time.

Developer C also has a limitation in that it has unacceptable speed losses when the development solution temperature is raised to 59° C. This example shows that it is possible to change the developer composition and developer temperature to effect near real time processing.

EXAMPLE 7

In this example we illustrate how a change in the concentration of CD-4 level in Developer B can be used to adjust the contrast of the film without at sacrifice in the speed performance of the film. We use Developer B for this example prepared with different levels of the developing agent, CD-4. The process is run at 46° C. for 60 seconds using KODAK MAX 800 color negative film, Table 8.

TABLE 8

| Mfg | Product Name | Developer Concentration (g/L) | Relative Red Speed | Relative Green Speed | Relative Blue Speed | Relative Red Best Fit Slope | Relative Green Best Fit Slope | Relative Blue Best Fit Slope |
|---|---|---|---|---|---|---|---|---|
| KODAK | MAX 800 | 3.5 | 100 | 113 | 106 | 49 | 53 | 65 |
| | | 6.5 | 99 | 100 | 106 | 62 | 67 | 83 |
| | | 10 | 100 | 96 | 98 | 71 | 77 | 93 |

Table 8 shows that the relative speed of the film is maintained at these different developer concentrations while the relative contrast of each color record is increased as the level of the developing agent is increased. In this case, the developer processing profile which includes the level of developer used in the developer can be balanced with the scanner and effluent management. For example, if the effluent management is more critical for a particular use, then a higher quality scanner that can operate with lower contrasts provides a system solution to the effluent management. On the other hand, if a low cost scanner is desired that needs higher image contrast in order to produce acceptable digital images, then the developing agent concentration in the developer can be increased to effect higher contrasts while maintaining acceptable film speed

EXAMPLE 8

Strips of two different 35 mm 800-speed colo negative films, KODAK MAX 800 and KONICA Centuria 800, were given a suitable exposure to visible light through a variable density test object and then processed in a processing chamber. Processing solutions and mixtures within the chamber, and processing solutions added to the chamber were kept at 46° C. and the solutions were agitated and mixed efficiently in the chamber. The process was as follows:

TABLE 9

| Step Number | Process Treatment | Volumes Conditions | Time |
|---|---|---|---|
| I. | Color Development | 9 volumes of Color Developer A | 70 sec |
| II. | Fixer | Rapidly add 6 volumes of Fixer A to Color Developer A in the chamber (=Mixture B) | 10 sec |
| III. | Bleach-fix | Rapidly add 6.4 volumes of Bleach A to Mixture B (=Mixture C) | varies |
| IV. | Wash | Remove film from chamber and wash with water | 120 sec |
| V. | Rinse | Dip film in Rinse A | 10 sec |
| VI. | Dry | Drain, then dry in air at 38° C. | |

Table 9 shows the execution order of a simulated merged process using a standard constant temperature bath with 1–8 liter processing tanks. In the merged process the post-development chemistry is sequentially introduced into a single-chamber processing tank of a batch processor. In the simulated processing sequence, unique processing chemical mixtures are formulated just prior to use to mimic the results obtained in a single-chamber reactor. The simulated merged process begins with the development step (Step I). After 70 seconds of processing, the film is physically moved into another processing tank (Step II) that contains a mixture of both Developer A and Fixer A referred to as Mixture B. Mixture B is formulated based on the volume per square foot of film that is being processed, a number also referred to in the trade as the replenishment rate. After 10 seconds in Mixture B, the film is then physically moved into a third tank (Step III) that contains a mixture of Developer A, Fixer A, and Bleach A referred to as Mixture C. Mixture C is formulated based on the replenishment rates. The film is removed from Mixture C at different times to illustrate the concept of stable densities. Following treatment in Mixture C, the film is then washed and dried as indicated in the Table 9. Fixer A, Bleach A and Rinse A were prepared as Fixer Formulations

| Component | Fixer A |
|---|---|
| Ammonium Thiosulfate solution (56% w/w ammonium thiosulfate, 4% w/w ammonium sulfite) | 525 mL/L |
| Sodium Metabisulfite | 7.8 g/L |
| Succinic acid | 12 g/L |
| pH (adjust with succinic acid) | 5.75 |

Bleach Formulations (units are grams/Liter)

| Component | Bleach A | Bleach B | Bleach C | Bleach D | Bleach E |
|---|---|---|---|---|---|
| 1,3-Diamino-propanetetraacetic acid | 156.8 | 156.8 | 156.8 | 156.8 | 156.8 |
| Succinic acid | 30 | 50 | 50 | 70 | 70 |
| Ferric Nitrate, 9 Hydrate | 188 | 188 | 188 | 188 | 188 |
| Ammonium hydroxide (28%) to dissolve the above ingredients | 160 ml/L | 160 ml/L | 160 ml/L | 160 ml/L | 160 ml/L |
| Nitric acid and Water to give a volume of 1 L and pH of | 3.5 | 3.5 | 4.0 | 3.5 | 3.0 |

| Rinse A | |
|---|---|
| KODAK Flexicolor Final Rinse and Replenisher (CAT No. 848 6268) dissolved in 991 mL water | 9 mL |

The red, green, and blue densities of the test object images on the films were measured with a densitometer. The densities for the same exposure level in a D-max area are shown in Table 10 below for each process time with the Color Developer A/Fixer A/Bleach A mixture (Mixture C).

TABLE 10

| Process time | KODAK MAX 800 | | | KONICA CENTURIA 800 | | |
|---|---|---|---|---|---|---|
| in Mixture C, sec | Red Density | Green Density | Blue Density | Red Density | Green Density | Blue Density |
| 50 | 1.61 | 2.22 | 2.82 | 1.90 | 2.36 | 2.81 |
| 60 | 1.26 | 1.97 | 2.55 | 1.72 | 2.22 | 2.69 |
| 70 | 1.18 | 1.86 | 2.32 | 1.64 | 2.10 | 2.54 |
| 80 | 1.20 | 1.89 | 2.36 | 1.59 | 2.04 | 2.48 |
| 90 | 1.20 | 1.88 | 2.32 | 1.58 | 2.04 | 2.49 |
| 100 | 1.19 | 1.88 | 2.32 | 1.60 | 2.05 | 2.50 |
| 110 | 1.19 | 1.88 | 2.32 | 1.55 | 2.01 | 2.45 |
| 120 | 1.17 | 1.85 | 2.28 | 1.53 | 1.97 | 2.42 |

Table 10 shows red, green, and blue densities at D-max for two selected films. Processing with the Color Developer A/Fixer A mixture stops color development and initiates fixing. Processing with the Color Developer A/Fixer A/Bleach A mixture continues fixing and initiates bleaching. After a sufficient time of bleaching and fixing the films exhibit stable image dye densities because bleaching and fixing have been completed. Stable image dye densities are within about 0.04 density units of a density obtained when bleaching and fixing are complete. If bleaching or fixing occur for an inadequate length of time, the densities are higher and more variable than they should be because the film contains unbleached or unfixed silver that contributes to the measured densities. it is important that bleaching and fixing take place for a sufficient time to be complete so that stable image dye densities are obtained. But it is also desirable to process for as short a time as possible so that customer images can be more rapidly obtained. When processing KODAK MAX 800 we can process it with a more rapid process sequence (processing with Mixture C for only 70 seconds) and achieve acceptable imaging results. With KONICA CENTURIA 800, a less rapid process sequence is selected (processing with Mixture C for 110 seconds) to achieve acceptable imaging results with the same amount of processing chemistry.

Our use of processing profiles allows both films to be optimally processed in the near real time processing system we have described.

EXAMPLE 9

Strips of 35 mm KONICA CENTURIA 800 were given a suitable exposure to visible light through a variable density test object and then processed in a processing chamber. Processing solutions and mixtures within the chamber, and processing solutions added to the chamber were kept at a constant temperature and the solutions were agitated and mixed efficiently in the chamber. The processing method is a simulated merged processing method, conducted as described in Example 8. One process was conducted at 42.6° C. and another process was conducted at 49.4° C. as follows:

At 42.6° C.:

| Step Number | Process Treatment | Volumes Conditions | Time |
|---|---|---|---|
| I. | Color Development | 9 volumes of Color Developer B | 80 sec |
| II. | Fixer | Rapidly add 3.67 volumes of Fixer A to Color Developer B in the chamber (=Mixture B) | 10 sec |
| III. | Bleach-fix | Rapidly add 5.67 volumes of Bleach B to Mixture B (=Mixture C) | varies |
| IV. | Wash | Remove film from chamber and wash with water | 120 sec |
| V. | Rinse | Dip film in Rinse A | 10 sec |
| VI. | Dry | Drain, then dry in air at 38° C. | |

At 49.4° C.:

| Step Number | Process Treatment | Volumes Conditions | Time |
|---|---|---|---|
| I. | Color Development | 9 volumes of Color Developer B | 50 sec |
| II. | Fixer | Rapidly add 3.67 volumes of Fixer A to Color Developer B in the chamber (=Mixture B) | 10 sec |
| III. | Bleach-fix | Rapidly add 5.67 volumes of Bleach B to Mixture B (=Mixture C) | varies |
| IV. | Wash | Remove film from chamber and wash with water | 120 sec |
| V. | Rinse | Dip film in Rinse A | 10 sec |
| VI. | Dry | Drain, then dry in air at 38° C. | |

The red, green, and blue densities of the test object images on the film were measured with a densitometer. The densities for the same exposure level in a D-max area are shown in Table 11 below for each process time with the Color Developer B/Fixer A/Bleach B mixture (Mixture C). Also, the residual silver in the D-max area of the film was measured by X-ray Fluorescence and the results are shown in Table 11.

TABLE 11

| | 42.6° C. | | | | 49.4° C. | | | |
|---|---|---|---|---|---|---|---|---|
| Process time in Mixture C., sec | Red Density | Green Density | Blue Density | D-max Residual Silver, g/m$^2$ | Red Density | Green Density | Blue Density | D-max Residual Silver, g/m$^2$ |
| 50 | 1.56 | 2.02 | 2.53 | 0.195 | 1.29 | 1.86 | 2.50 | 0.110 |
| 60 | 1.44 | 1.89 | 2.38 | 0.097 | 1.29 | 1.85 | 2.48 | 0.046 |
| 70 | 1.43 | 1.87 | 2.35 | 0.044 | 1.30 | 1.84 | 2.47 | 0.038 |
| 80 | 1.47 | 1.91 | 2.40 | 0.015 | 1.35 | 1.89 | 2.53 | 0.012 |
| 90 | 1.49 | 1.93 | 2.42 | 0.016 | 1.31 | 1.86 | 2.49 | 0.014 |
| 100 | 1.49 | 1.92 | 2.42 | 0.008 | 1.35 | 1.90 | 2.53 | 0.022 |

The data in Table 11 shows that after a sufficient time of bleaching and fixing the film exhibits stable image dye densities because bleaching and fixing have been completed. Stable image dye densities are within about 0.04 density units of a density obtained when bleaching and fixing are complete (when less than about 0.11 g/m$^2$ of residual silver remains in D-max areas of this film). These stable densities and residual silver levels are shown in bold type in Table 11. If bleaching or fixing occur for an inadequate length of time, the densities are higher and more variable than they should be because the film contains unbleached or unfixed silver that contributes to the measured densities. It is important that bleaching and fixing take place for a sufficient time to be complete so that stable image dye densities are obtained. But it is also desirable to process for as short a time as possible so that customer images can be more rapidly obtained. When processing KONICA CENTURIA 800 we can process it with a more rapid process sequence at a higher temperature (processing with Developer B for 50 seconds and with Mixture C for 50 seconds) and achieve acceptable imaging results. Alternatively, we can elect to process KONICA CENTURIA 800 at a lower temperature but in a slower overall process (processing with Developer B for 80 seconds and with Mixture C for 60 seconds). Such a process might be selected to conserve energy requirements for the process.

EXAMPLE 10

Strips of 35 mm KODAK MAX 800 were given a suitable exposure to visible light through a variable density test object and then processed in a processing chamber. Processing solutions and mixtures within the chamber, and processing solutions added to the chamber were kept at 43.4° C. and the solutions were agitated and mixed efficiently in the chamber. The processing method is a simulated merged processing method, conducted as described in Example 8. The process was conducted as follows:

| Step Number | Process Treatment | Volumes Conditions | Time |
|---|---|---|---|
| I. | Color Development | 9 volumes of Color Developer D | 60 sec |
| II. | Fixer | Rapidly add 6 volumes of Fixer A to Color Developer D in the chamber (=Mixture B) | 10 sec |
| III. | Bleach-fix | Rapidly add 6 volumes of Bleach B, C, D or E to Mixture B (=Mixture C) | varies |

-continued

| Step Number | Process Treatment | Volumes Conditions | Time |
|---|---|---|---|
| IV. | Wash | Remove film from chamber and wash with water | 120 sec |
| V. | Rinse | Dip film in Rinse A | 10 sec |
| VI. | Dry | Drain, then dry in air at 38° C. | |

The red, green, and blue densities of the test object images on the film were measured with a densitometer. The densities for the same exposure level in a D-max area are shown in Table 12 and Table 13 below for each process time with the Color Developer D/Fixer A/Bleach mixture (Mixture C). The residual silver in the D-max area of the film was measured by X-ray Fluorescence and the results are also shown in Tables 12 and 13.

Table 13 shows that bleach-fixing is more rapid still with Bleach D used to prepare Mixture C, evidenced by the low residual silver in the film. Bleach D contains more succinic acid buffer than Bleach B, but at the same pH as Bleach B. Finally, the most rapid bleach-fixing occurs with a Mixture C prepared from Bleach E. Bleach-fixing is complete in about 70 seconds with this bleach. Bleach E is compositionally the same as Bleach D, but more acid was used to produce a lower bleach pH of 3.0. Thus, bleaching can be made more rapid by introducing a higher amount of buffering compound into the bleach (succinic acid) and/or by introducing more acid into the bleaching composition to lower its pH. The trade-off comes in the form of increased chemical costs for the buffering compound and acid. The buffering compound and/or acid can be delivered independently by the processor as the bleach is formulated or delivered to the processing chamber. Alternatively, we can elect to process KODAK MAX 800 in Mixture C more or less rapidly by conducting the process at a higher or lower temperature than the above (thereby consuming more or less energy in the process), or by introducing more or less volume of Bleach into the processing chamber to create Mixture C. A higher volume of bleach will increase the bleach concentration and enable more rapid bleach processing, but with the trade-off of higher chemical consumption, energy consumption (to heat the additional volume of solution), and cost.

TABLE 12

| | Bleach C | | | | Bleach B | | | |
|---|---|---|---|---|---|---|---|---|
| Process time in Mixture C., sec | Red Density | Green Density | Blue Density | D-max Residual Silver, $g/m^2$ | Red Density | Green Density | Blue Density | D-max Residual Silver, $g/m^2$ |
| 40 | 1.98 | 2.67 | 3.57 | 0.572 | 1.86 | 2.54 | 3.44 | 0.556 |
| 50 | 1.84 | 2.53 | 3.39 | 0.343 | 1.75 | 2.44 | 3.30 | 0.292 |
| 60 | 1.57 | 2.34 | 3.19 | 0.216 | 1.43 | 2.25 | 3.13 | 0.143 |
| 70 | 1.43 | 2.24 | 3.10 | 0.118 | 1.23 | 2.05 | 2.96 | 0.095 |
| 80 | 1.34 | 2.18 | 3.06 | 0.106 | 1.17 | 1.96 | 2.86 | 0.063 |
| 90 | 1.22 | 2.06 | 2.94 | 0.076 | 1.16 | 1.95 | 2.83 | 0.055 |

The data in Table 12 shows that stable image dye densities within about 0.04 density units of a density are obtained when bleaching and fixing are complete (when less than about 0.06 $g/m^2$ of residual silver remains in D-max areas of this film). These stable densities and residual silver levels are shown in bold type in the Tables. The data in Table 12 shows that processing KODAK MAX 800 with Mixture C prepared from Bleach C fails to satisfactorily bleach-fix the film in 90 seconds. Bleach B, compositionally the same as Bleach C but with more nitric acid to produce a lower bleach pH, results in a more rapid bleach-fixing mixture C; bleach-fixing is complete in about 80 seconds with this bleach.

EXAMPLE 11

Strips of 35 mm KODAK MAX 800 were given a suitable exposure to visible light through a variable density test object and then processed in a processing chamber. Process-

TABLE 13

| | Bleach D | | | | Bleach E | | | |
|---|---|---|---|---|---|---|---|---|
| Process time in Mixture C., sec | Red Density | Green Density | Blue Density | D-max Residual Silver, $g/m^2$ | Red Density | Green Density | Blue Density | D-max Residual Silver, $g/m^2$ |
| 40 | 1.80 | 2.50 | 3.38 | 0.516 | 1.70 | 2.43 | 3.30 | 0.514 |
| 50 | 1.62 | 2.36 | 3.25 | 0.272 | 1.50 | 2.22 | 3.15 | 0.277 |
| 60 | 1.25 | 2.07 | 3.02 | 0.108 | 1.17 | 1.98 | 2.88 | 0.093 |
| 70 | 1.16 | 1.95 | 2.79 | 0.053 | 1.12 | 1.89 | 2.68 | 0.051 |
| 80 | 1.12 | 1.86 | 2.63 | 0.046 | 1.11 | 1.86 | 2.61 | 0.042 |
| 90 | 1.12 | 1.87 | 2.63 | 0.036 | 1.13 | 1.90 | 2.66 | 0.016 |

ing solutions and mixtures within the chamber, and processing solutions added to the chamber were kept at 43.4° C. and the solutions were agitated and mixed efficiently in the chamber. The processing method is a simulated merged processing method, conducted as described in Example 8. Two rocesses were conducted as follows:

Process 1:

| Step Number | Process Treatment | Volumes Conditions | Time |
|---|---|---|---|
| I. | Color Development | 9 volumes of Color Developer D | 60 sec |
| II. | Fixer | Rapidly add 3.67 volumes of Fixer A to Color Developer D in the chamber (=Mixture B) | 10 sec |
| III. | Bleach-fix | Rapidly add 5.67 volumes of Bleach B to Mixture B (=Mixture C) | varies |
| IV. | Wash | Remove film from chamber and wash with water | 120 sec |
| V. | Rinse | Dip film in Rinse A | 10 sec |
| VI. | Dry | Drain, then dry in air at 38° C. | |

Process 2:

| Step Number | Process Treatment | Volumes Conditions | Time |
|---|---|---|---|
| I. | Color Development | 9 volumes of Color Developer D | 60 sec |
| II. | Fixer | Rapidly add 6 volumes of Fixer A to Color Developer D in the chamber (=Mixture B) | 10 sec |
| III. | Bleach-fix | Rapidly add 6 volumes of Bleach B to Mixture B (=Mixture C) | varies |
| IV. | Wash | Remove film from chamber and wash with water | 120 sec |
| V. | Rinse | Dip film in Rinse A | 10 sec |
| VI. | Dry | Drain, then dry in air at 38° C. | |

The residual silver in the D-max and D-min areas of the film was measured by X-ray Fluorescence and the results are shown in Table 14.

TABLE 14

| Process time in Mixture C, sec | Process 1 D-min Residual Silver, $g/m^2$ | Process 1 D-max Residual Silver, $g/m^2$ | Process 2 D-min Residual Silver, $g/m^2$ | Process 2 D-max Residual Silver, $g/m^2$ |
|---|---|---|---|---|
| 50 | 0.326 | 0.482 | 0.169 | 0.292 |
| 60 | 0.218 | 0.346 | 0.062 | 0.143 |
| 70 | 0.083 | 0.110 | 0.014 | 0.095 |
| 80 | 0.039 | 0.055 | 0.036 | 0.063 |
| 90 | 0.026 | 0.043 | 0.032 | 0.055 |

Silver amounts that signify complete fixing and bleaching are shown in bold type.

The data in Table 14 show how the bleaching and fixing can be balanced for optimum results without wasting solutions. The residual silver in D-max areas reported in Table 14 is ameasure of the completeness of bleaching and fixing for a given process time with Mixture C and the residual silver in D-min areas is a measure of the completeness of fixing. As stated previously, it is important that bleaching and fixing take place for a sufficient time to be complete so that stable image dye densities are obtained. But it is not necessary for either of bleaching or fixing to be more rapid than the other, just that they be complete at the same time. If either of bleaching or fixing were more rapid than the other, then the process would be operating wastefully with respect to the more rapid chemical component. The process can be conducted successfully no more rapidly than the slower of bleaching or fixing with Mixture C. As shown in the Example above, KODAK MAX 800 is satisfactorily bleached and fixed when no more than about 0.06 $g/m^2$ of residual silver is present. In Process 2, fixing takes place significantly more rapidly than does bleaching. D-min areas are completely fixed in about 60 seconds, but D-max areas require 80 seconds to completely bleach. Therefore in Process 2 at least 80 seconds of processing with Mixture C is required. In Process 1, which uses significantly less volume of Fixer A and a smaller volume of Bleach B as well, the fixing and bleaching rates are more similar. Fixing is complete in about 80 seconds, as is bleaching. Process 1 achieves satisfactory processing of KODAK MAX 800 in 80 seconds with Mixture C, the same as required for Process 2 but with significantly less usage of processing chemistry.

Other films to be processed may require different amounts of Fixer A and Bleach B than KODAK MAX 800 for the most efficient processing from the standpoint of chemical consumption. These amounts can be determined for each film and supplied to the processing chamber by the processor. As an example, KONICA CENTURIA 800 was processed according to Process 1, above. The residual silver amounts were measured by X-ray fluorescence and are shown in Table 15 with the silver amounts for KODAK MAX 800 for comparison.

TABLE 15

| Process 1 time in Mixture C, sec | KODAK MAX 800 D-min Residual Silver, $g/m^2$ | KODAK MAX 800 D-max Residual Silver, $g/m^2$ | KONICA CENTURIA 800 D-min Residual Silver, $g/m^2$ | KONICA CENTURIA 800 D-max Residual Silver, $g/m^2$ |
|---|---|---|---|---|
| 50 | 0.326 | 0.482 | 0.176 | 0.493 |
| 60 | 0.218 | 0.346 | 0.090 | 0.382 |
| 70 | 0.083 | 0.110 | 0.007 | 0.245 |
| 80 | 0.039 | 0.055 | 0.014 | 0.136 |
| 90 | 0.026 | 0.043 | 0.017 | 0.079 |
| 100 | 0.015 | 0.043 | 0.013 | 0.049 |
| 110 | 0.013 | 0.022 | 0.013 | 0.039 |

Silver amounts that signify complete fixing and bleaching are shown in bold type.

The data in Table 15 show that KONICA CENTURIA 800 fixes much more rapidly than it bleaches. It fixes more rapidly than KODAK MAX 800 and it bleaches more slowly than KODAK MAX 800. An optimum process for KONICA CENTURIA 800 would therefore use relatively more bleach and/or relatively less fixer than the process for KODAK MAX 800 so as to make best use of the chemistry applied.

EXAMPLE 12

Examples of the plurality of adjustable parameters that can be used in the processing profiles include, but are not limited to, time, temperature, processing solution concentration of active agents, and volume of solution used to effect the desired reaction. It is clear that the number of these profiles increases dramatically as the plurality of adjustable parameters increases. It is also clear from the Examples that the plurality of adjustable parameters can be varied to satisfy other value propositions besides near real time processing. For instance, we have shown that the processing profiles can be designed to lower the volume of processing effluent, designed to lower the concentration of active agents that are discharged into the effluent, designed to reduce energy consumption by operating at lower temperatures than other processing profiles, and can be designed to accommodate the performance limitations of other system components. The examples of processing profiles that are described in Table 16 are examples of those that can minimize total processing time.

TABLE 16

| Component | Profile 1 | Profile 2 | Profile 3 | Profile 4 |
|---|---|---|---|---|
| Developer Name | Developer A | Developer A | Developer A | Developer C |
| Development Time | 70 seconds | 55 seconds | 90 seconds | 30 seconds |
| Development Temp | 46 C. | Like 1 | Like 1 | 55 C. |
| Development Volume (ml/ Linear foot of 35 mm film) | 9.0 ml/linear foot | Like 1 | Like 1 | Like 1 |
| Acid Fix Name | Fixer A | Like 1 | Like 1 | Like 1 |
| Acid Fix Time (sec) | 10 seconds | Like 1 | Like 1 | Like 1 |
| Acid Fix Temp (° C.) | 49.4 C. | Like 1 | Like 1 | Like 1 |
| Acid Fix Volume (ml/Linear foot of 35 mm film) | 3.67 ml/linear foot | Like 1 | Like 1 | Like 1 |
| Bleach Name | B | Like 1 | Like 1 | E |
| Bleach Time (sec) | 50 seconds | Like 1 | Like 1 | 50 |
| Bleach Temp (° C.) | 49.4 C. | Like 1 | Like 1 | Like 1 |
| Bleach Volume (ml/Linear foot of 35 mm film) | 5.67 ml/linear foot | Like 1 | Like 1 | Like 1 |
| Wash Name | Rinse A | Like 1 | Like 1 | Water only |
| Number of Washes | 4 | Like 1 | Like 1 | Like 1 |
| Wash Time (sec) | 10 seconds | Like 1 | Like 1 | Like 1 |
| Wash Temp (° C.) | Room temp | Like 1 | Like 1 | Like 1 |
| Each Wash Volume (ml/Linear foot of 35 mm film) | 6 ml/linear foot | Like 1 | Like 1 | Like 1 |
| Total Time | 170 seconds | 155 seconds | 190 seconds | 130 seconds |

For this example, the family of films is the color negative film family for still photography. Profile 1 is used to process members of this film family that include 100, 200, 400, and 800 speed films of KONICA, FUJI, AGFA, KODAK, and FERRANIA. The total process time for Profile 1 is 170 seconds. Profile 2 can be used to process KODAK GOLD 100 and GOLD 200 films at even faster times while using the same developer composition as used in Profile 1. The total process time for Profile 2 is 155 seconds. A longer processing time is required to develop FUJI SUPERIA 1600 according to Profile 3. The total processing time for Profile 3 is 190 seconds. Profile 4 provides the fastest overall processing time of 130 seconds. This Profile features a hot, more concentrated developer and a fast acting bleach-fix to get short processing times for KODAK MAX 800 and KONICA CENTURIA 800.

The rapid processing examples described above are capable of producing an archival negative. However, the resulting negative will often not be suitable for making an optical print using conventional photographic printers. An acceptable print is made according to the present invention by scanning the processed films to produce a digital image and processing the digital image to correct for differences between the system and standard contrast and film speed. The resulting processed digital image can then be printed using a digital printer to produce an acceptable photographic print.

Although the invention has been described with respect to a chemical film process that includes all of the conventional steps of development through fixing, it could also be applied to a non-conventional process of the type that omits one or more of the conventional processing steps. For example the method of the present invention could be applied to a process of the type disclosed in U.S. Pat. No. 5,988,896, referenced above, to optimize the process for different members of a film family.

The invention has been described in detail with particular reference to certain preferred embodiments thereof, but it will be understood that variations and modifications can be effected within the spirit and scope of the invention.

PARTS LIST

1 minimum density of film characteristic curve
2 D-max point of film characteristic curve
3 speed point of film characteristic curve
4 film characteristic curve
7 stable densities range
8 point on film characteristic curve delivering system speed loss of 0 15 logE or less
9 toe of film characteristic curve
10 film processor
12 controller
14 film
16 scanner
18 digital image processor
22 identify film step
24 processing profiles
26 select processing profile step
28 process film step
30 obtain customized processing profile step
32 scan processed film step
34 process digital image step
36 Remote Image Data Manager
38 digital correction factors
40 storage device
44 interactive terminal
46 display device
48 printer
50 image fulfillment center
52 produce print step
54 print

What is claimed is:

1. A method of processing photographic film images, comprising the steps of:

a) providing a film processor having a plurality of adjustable parameters for a given process for processing a family of photographic films;

b) defining a plurality of processing profiles having different values of the adjustable parameters for different members of the film family; and c) chemically processing a photographic film that is a member of the film family using the processing profile for that family member.

2. The method claimed in claim 1, wherein the adjustable parameters include one or more parameters selected from the group comprising processing time, temperature, solution composition, and solution volume.

3. The method claimed in claim 1, wherein the film processor is a small solution volume batch processor that uses less than 1000 ml of processing solution per roll of 24 exposure 35 mm film.

4. The method claimed in claim 1, wherein the film processor is a small solution volume continuous processor that uses less than 500 ml of processing solution per roll of 24 exposure 35 mm film.

5. The method claimed in claim 1, wherein the processing profiles produce stable film densities.

6. The method claimed in claim 1, wherein the processing profiles produce film contrasts that are greater than 25% and less than 130% of those achieved in a standard chemical process.

7. The method claimed in claim 1, wherein the total wet processing times of the processing profiles are less than 450 seconds.

8. The method claimed in claim 1, wherein the processing profiles are preloaded in the film processor.

9. The method claimed in claim 1, wherein the processing profile for the family member is retrieved using a code associated with the film.

10. The method claimed in claim 9, wherein the processing profiles are specified by a film manufacturer.

11. The method claimed in claim 9, wherein the processing profiles are downloaded to the film processor.

12. The method claimed in claim 9, wherein the code is a DX code located on a film cassette.

13. The method claimed in claim 9, wherein the code is a magnetic code located on the film.

14. The method claimed in claim 1, further comprising the steps of:

d) scanning the processed film to produce a digital image; and e) processing the digital image to correct for differences between the processed film and a film processed using a standard chemical process.

15. The method claimed in claim 14, further comprising the step of transmitting the corrected digital image to an output device.

16. The method claimed in claim 15, further comprising the step of printing the corrected digital image.

17. The method claimed in claim 15, further comprising the step of displaying the corrected digital image.

18. The method claimed in claim 14, further comprising the step of storing the corrected digital image.

19. The method claimed in claim 18, further comprising the step of transmitting the corrected digital image to an output device.

20. The method claimed in claim 19, further comprising the step of printing the corrected digital image.

21. The method claimed in claim 19, further comprising the step of displaying the corrected digital image.

22. The method claimed in claim 1, wherein different members of the film family are chemically and physically identical and are associated with different processing profiles, whereby different speed/grain characteristics are produced for the different film family members.

23. The method claimed in claim 1, wherein the processing profiles produce stable densities, system film contrast that is between 25% and 130%, and system film speed loss that is no greater than 0.15 logE of the contrast and speed, respectively, of a standard chemical process for the film family, and wherein at least one of the processing profiles will not produce stable densities, system contrast or speed within the range noted above with at least one member of the film family.

24. A method of processing photographic film images, comprising the steps of:

a) providing a film processor having a plurality of adjustable parameters for a given process for processing a family of photographic films;

b) defining a plurality of processing profiles having different values of the adjustable parameters for different members of the film family which will produce stable densities, system film contrast that is between 25% and 130%, and system film speed loss that is no greater than 0.15 logE of the contrast and speed, respectively, of a standard chemical process for the film family, and wherein at least one of the processing profiles will not produce stable densities, system contrast or speed within the range noted above with at least one member of the film family;

c) chemically processing films from different members of the film family using the corresponding processing profiles, d) scanning the processed films to produce digital images; and e) processing the digital images to correct for differences between the system and standard contrast and film speed.

25. The method claimed in claim 24, wherein the family of films is color negative films.

26. The method claimed in claim 24, wherein the contrasts and speed includes Red, Green and Blue contrasts and speeds.

27. The method claimed in claim 25, wherein the standard chemical process is selected from the group comprising C4 1, CN 16, AP 70 and CNK-4.

28. The method claimed in claim 25, wherein the members of the film family are the color negative films listed in the PIMA DX code reference table.

29. The method claimed in claim 24, wherein the film family is color reversal photographic film.

30. The method claimed in claim 29, wherein the members of the film family are the color reversal films listed in the PIMA DX code reference table.

31. The method claimed in claim 24, wherein the adjustable parameters are selected from the group comprising time, temperature, agitation, and processing solution concentrations.

32. The method claimed in claim 24, wherein the system contrast is between 40% and 120% of the contrast of the standard chemical process.

33. The method claimed in claim 24, wherein the system contrast is between 60% and 110% of the contrast of the standard chemical process.

34. The method claimed in claim 24, wherein system film speed loss that is no greater than 0.10 logE of the speed of the standard chemical process.

35. The method claimed in claim 24, wherein the system film speed loss that is no greater than 0.05 logE of the standard chemical process.

36. The method claimed in claim 24, wherein the step of correcting the digital images includes the steps of providing a family of corrections, one for each member of the family, and employing the corresponding correction to the members of the film family.

37. The method claimed in claim 24, further comprising the step transmitting the corrected digital image to an output device.

38. The method claimed in claim 37, further comprising the step of printing the corrected digital image.

39. The method claimed in claim 37, further comprising the step of displaying the corrected digital image.

40. The method claimed in claim 24, further comprising the step of storing the corrected digital image.

41. The method claimed in claim 40, further comprising the step transmitting the corrected digital image to an output device.

42. The method claimed in claim 41, further comprising the step of printing the corrected digital image.

43. The method claimed in claim 41, further comprising the step of displaying the corrected digital image.

44. The method claimed in claim 24, wherein the method is practiced in a photofinishing kiosk that is operator unassisted.

45. The method claimed in claim 24, wherein the method is practiced in a photofinishing kiosk that is operator assisted.

46. The method claimed in claim 24, wherein the e method is practiced in at a walk-up photofinishing counter that is operator assisted.

47. The method claimed in claim 24, wherein the digital image processing step includes the steps of:

a) applying a first correction to the R, G, and B image signals for the film processed through the system of this invention using separate 1DUTs to produce adjusted R', G', and B' image signals;

b) applying a second correction to the adjusted R', G', and B' image signal triplets using a low order multinomial, or 3DLUTs to produce transformed R", G", and B" image signal triplets, and, c) applying a third correction to the transformed R", G", and B" image signals using separate 1DLUTs.

48. The method claimed in claim 47, wherein the first correction applying step maps a neutral tone scale for the film processed through the system of this invention to a reference neutral tone scale, the second correction applying step preserves the reference neutral tone scale and applies a color correction, and the third correction applying step maps the reference neutral tone scale to a neutral tone scale for the film processed through the standard process.

49. The method claimed in claim 48, wherein the reference neutral tone scale is the green image signal of a neutral tone scale for the film processed through the standard process.

50. A system for processing photographic film images, comprising:

a) a film processor having a plurality of adjustable parameters for a given process for processing a family of photographic films;

b) a plurality of processing profiles having different values of the adjustable parameters for different members of the film family; and c) means for selecting a processing profile from the plurality thereof for a member of the film family.

51. The system claimed in claim 50, wherein the adjustable parameters include one or more parameters selected from the group comprising processing time, temperature, solution composition, and solution volume.

52. The system claimed in claim 50, wherein the film processor is a small solution volume batch processor that uses less than 1000 ml of processing solution per 24 exposure 35 mm film.

53. The system claimed in claim 50, wherein the film processor is a small solution volume continuous processor that uses less than 500 ml of processing solution per 24 exposure 35 mm film.

54. The system claimed in claim 50, wherein the processing profiles produce stable film densities.

55. The system claimed in claim 50, wherein the processing profiles produce film contrasts that are greater than 25% and less that 130% of those achieved in a standard chemical process.

56. The system claimed in claim 50, wherein the processing profiles include total wet processing times of less than 450 seconds.

57. The system claimed in claim 50, wherein the processing profiles are preloaded in the film processor.

58. The system claimed in claim 50, further including means for retrieving the processing profile for the family member using a code associated with the film.

59. The system claimed in claim 58, including means for allowing the processing profiles to be specified by a film manufacturer.

60. The system claimed in claim 58, including means for downloading the processing profiles to the film processor.

61. The system claimed in claim 58, wherein the code is a DX code located on a film cassette.

62. The system claimed in claim 58, wherein the code is a magnetic code located on the film.

63. The system claimed in claim 50, further comprising:

d) a scanner for scanning the processed film to produce a digital image, and e) a digital image processor for processing the digital image to correct for differences between the processed film and a film processed using a standard chemical process.

64. The system claimed in claim 63, further comprising:

f) transmission means for transmitting the corrected digital image and g) an output device, to which the corrected digital image is transmitted, for printing the corrected digital image.

65. The system claimed in claim 63, further comprising:

f) transmission means for transmitting the corrected digital image and g) an output device, to which the corrected digital image is transmitted, for displaying the corrected digital image.

66. The system claimed in claim 63, further comprising:

f) a storage device or medium for storing the corrected digital image.

67. The system claimed in claim 66, further comprising:

g) transmission means for transmitting the corrected digital image and h) an output device, to which the corrected digital image is transmitted, for printing the corrected digital image.

68. The system claimed in claim 66, further comprising:

f) transmission means for transmitting the corrected digital image and g) an output device, to which the corrected digital image is transmitted, for displaying the corrected digital image.

69. The system claimed in claim 50, wherein different members of the film family are chemically and physically identical and are associated with different processing profiles, whereby different speed/grain characteristics are produced for the different film family members.

70. The system claimed in claim 50, wherein the processing profiles produce stable densities, system film contrast that is between 25% and 130%, and system film speed loss that is no greater than 0.15 logE of the contrast and speed, respectively, of a standard chemical process for the film family, and wherein at least one of the processing profiles will not produce stable densities, system contrast or speed within the range noted above with at least one member of the film family.

71. A system for processing photographic film images, comprising:

a) a film processor having a plurality of adjustable parameters for a given process for processing a family of photographic films;

b) a plurality of processing profiles having different values of the adjustable parameters for different members of the film family which will produce stable densities, system film contrast that is between 25% and 130%, and system film speed loss that is no greater than 0.15 logE of the contrast and speed, respectively, of a standard chemical process for the film family, and wherein at least one of the processing profiles will not produce stable densities, system contrast or speed within the range noted above with at least one member of the film family;

c) means for chemically processing films from different members of the film family using the corresponding processing profiles;

d) a scanner for scanning the processed films to produce digital images; and e) means for processing the digital images to correct for differences between the system and standard contrast and film speed.

72. The system claimed in claim 71, wherein the family of films is color negative films.

73. The system claimed in claim 71, wherein the contrasts and speed includes Red, Green and Blue contrasts and speeds.

74. The system claimed in claim 72, wherein the standard chemical process is selected from the group comprising C41, CN16, AP 70 and CNK-4.

75. The system claimed in claim 72, wherein the members of the film family are the color negative films listed in the PIMA DX code reference table.

76. The system claimed in claim 71, wherein the film family is color reversal photographic film.

77. The system claimed in claim 76, wherein the members of the film family are the color reversal films listed in the PIMA DX code reference table.

78. The system claimed in claim 71, wherein the adjustable parameters are selected from the group comprising time, temperature, agitation, and processing solution concentrations.

79. The system claimed in claim 71, wherein the system contrast is between 40% and 120% of the contrast of the standard chemical process.

80. The system claimed in claim 71, wherein the system contrast is between 60% and 110% of the contrast of the standard chemical process.

81. The system claimed in claim 71, wherein system film speed loss that is no greater than 0.10 logE of the speed of the standard chemical process.

82. The system claimed in claim 71, wherein the system film speed loss that is no greater than 0.05 logE of the standard chemical process.

83. The system claimed in claim 71, wherein the step of correcting the digital images includes the steps of providing a family of corrections, one for each member of the family, and employing the corresponding correction to the members of the film family.

84. The system claimed in claim 71, further comprising: means for transmitting the corrected digital image to an output device.

85. The system claimed in claim 84, further comprising: a printer for printing the corrected digital image.

86. The system claimed in claim 84, further comprising: a display device for displaying the corrected digital image.

87. The system claimed in claim 71, further comprising: a storage device or medium for storing the corrected digital image.

88. The system claimed in claim 87, further comprising: means for transmitting the corrected digital image to an output device.

89. The system claimed in claim 84, further comprising: a printer for printing the corrected digital image.

90. The system claimed in claim 84, further comprising: a display device for displaying the corrected digital image.

91. The system claimed in claim 71, wherein the system comprises a photofinishing kiosk that is operator unassisted.

92. The system claimed in claim 71, wherein the system comprises a photofinishing kiosk that is operator assisted.

93. The system claimed in claim 71, wherein the system is at a walk-up photofinishing counter that is operator assisted.

94. The system claimed in claim 71, wherein the means for digital image processing includes:

a) means for applying a first correction to the R, G, and B image signals for the film processed through the system of this invention using separate 1DUTs to produce adjusted R', G', and B' image signals;, b) means for applying a second correction to the adjusted R', G', and B' image signal triplets using a low order multinomial, or 3DLUTs to produce transformed R", G", and B" image signal triplets; and;

c) means for applying a third correction to the transformed R", G", and B" image signals using separate 1DLUTs.

95. The system claimed in claim 94 wherein the first correction applying means maps a neutral tone scale for the film processed through the system of this invention to a reference neutral tone scale, the second correction applying means preserves the reference neutral tone scale and applies a color correction, and the third correction applying means maps the reference neutral tone scale to a neutral tone scale for the film processed through the standard process.

96. The system claimed in claim 95, wherein the reference neutral tone scale is the green image signal of a neutral tone scale for the film processed through the standard process.

* * * * *